United States Patent
Nojiri et al.

(10) Patent No.: US 9,341,882 B2
(45) Date of Patent: May 17, 2016

(54) LAMINATE, POLARIZING PLATE, LIQUID CRYSTAL DISPLAY DEVICE, AND METHOD OF MANUFACTURING POLARIZING PLATE

(71) Applicant: FUJIFILM Corporation, Tokyo (JP)

(72) Inventors: Mayumi Nojiri, Kanagawa (JP); Takahiro Ohno, Kanagawa (JP); Nobutaka Fukagawa, Kanagawa (JP); Yu Naito, Kanagawa (JP); Hiroyuki Ishikawa, Kanagawa (JP); Naoya Shimoju, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 75 days.

(21) Appl. No.: 14/187,902

(22) Filed: Feb. 24, 2014

(65) Prior Publication Data

US 2014/0242302 A1 Aug. 28, 2014

(30) Foreign Application Priority Data

Feb. 25, 2013 (JP) .................. 2013-034156
Feb. 5, 2014 (JP) .................. 2014-020395

(51) Int. Cl.
*C09K 19/00* (2006.01)
*G02F 1/1335* (2006.01)
*G02B 5/30* (2006.01)

(52) U.S. Cl.
CPC ........ *G02F 1/133528* (2013.01); *G02B 5/3025* (2013.01); *Y10T 428/10* (2015.01); (Continued)

(58) Field of Classification Search
CPC ............. G02F 1/133528; G02F 1/133533; G02B 1/08; G02B 5/30; G02B 5/3025; G02B 5/3033; Y10T 428/10; Y10T 428/1036; Y10T 428/1041; Y10T 428/1059; Y10T 428/1082; C08J 5/18
USPC ............ 428/1.1, 1.3, 1.31, 1.55, 1.5, 355 EN; 156/327; 349/96; 359/487.01, 487.02; 252/585; 106/170.1
See application file for complete search history.

(56) References Cited

U.S. PATENT DOCUMENTS

2007/0009676 A1 1/2007 Tamagawa et al.
2011/0134374 A1 6/2011 Fukagawa et al.
(Continued)

FOREIGN PATENT DOCUMENTS

JP 06-265725 A 9/1994
JP 2002-236212 8/2002
(Continued)

OTHER PUBLICATIONS

Non-Final Office Action issued by USPTO on Jul. 8, 2014 in connection with co-pending U.S. Appl. No. 13/749,043.
(Continued)

*Primary Examiner* — Ruiyun Zhang
(74) *Attorney, Agent, or Firm* — Jean C. Edwards, Esq.; Edwards Neils PLLC

(57) ABSTRACT

Provided is a polarizing plate having improved single plate transmittance under high-temperature and high-humidity conditions, and a liquid crystal display device using the same. A laminate including a polarizer, and an adhesive layer adjoining to at least one surface of the polarizer, the adhesive layer containing a resin and a compound, etc. represented by the formula (1) below. In the formula (1), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group or $C_{6-20}$ aromatic group, and $R^5$ represents a substituent Formula (1) polarizing plate

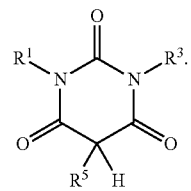

11 Claims, 2 Drawing Sheets

(52) U.S. Cl.
CPC ...... *Y10T428/1036* (2015.01); *Y10T 428/1059* (2015.01); *Y10T 428/1082* (2015.01); *Y10T 428/2878* (2015.01); *Y10T 428/31884* (2015.04)

(56) References Cited

U.S. PATENT DOCUMENTS

| | | | |
|---|---|---|---|
| 2011/0273646 A1* | 11/2011 | Fukagawa et al. | 349/96 |
| 2012/0088041 A1* | 4/2012 | Fukagawa et al. | 428/1.33 |
| 2013/0189449 A1 | 7/2013 | Fukagawa et al. | |

FOREIGN PATENT DOCUMENTS

| | | |
|---|---|---|
| JP | 2003-165188 A | 6/2003 |
| JP | 2003-207620 | 7/2003 |
| JP | 2004-012578 A | 1/2004 |
| JP | 2005-105066 | 4/2005 |
| JP | 2006-163082 | 6/2006 |
| JP | 2007-047536 A | 2/2007 |
| JP | 2009-037223 | 2/2009 |
| JP | 2009-086362 | 4/2009 |
| JP | 2011-118135 A | 6/2011 |
| JP | 2011-126968 | 6/2011 |
| JP | 2012-014148 | 1/2012 |
| JP | 2012-098698 | 5/2012 |
| WO | WO-2007-007565 A1 | 1/2007 |
| WO | WO-2009-107405 | 9/2009 |
| WO | WO-2012-169629 | 12/2012 |

OTHER PUBLICATIONS

Notice of Reasons for Rejection, issued by Japanese Patent Office on Feb. 10, 2015, in connection with Japanese Patent Application No. 2012-252635.

Office Action issued by the Japanese Patent Office on Jan. 27, 2015, in connection with Japanese Patent Application No. 2014-020395.

Office Action issued by the U.S. Patent and Trademark Office on Dec. 18, 2014 in connection with U.S. Appl. No. 13/749,043.

\* cited by examiner

LAMINATE, POLARIZING PLATE, LIQUID CRYSTAL DISPLAY DEVICE, AND METHOD OF MANUFACTURING POLARIZING PLATE

CROSS-REFERENCE TO RELATED APPLICATIONS

The present application claims the benefit of priority from Japanese Patent Application Nos. 2013-034156, filed on Feb. 25, 2013 and 2014-020395, filed on Feb. 5, 2014, the contents of all of which are herein incorporated by reference in their entirety.

TECHNICAL FIELD

The present invention relates to a laminate having a polarizer and an adhesive layer. The present invention also relates to a polarizing plate having the laminate, and still also to a liquid crystal display device having the polarizing plate, and a method of manufacturing the polarizing plate.

BACKGROUND ART

Liquid crystal display device has been disseminated as a space-saving image display device with low power consumption, and has been expanding its applications year by year.

The liquid crystal display device is generally configured by providing polarizing plates on both sides of a liquid crystal cell. The polarizing plate functionally allows only light having a certain directionality of plane of polarization to pass therethrough, and performance of the polarizing plate largely affects performance of the liquid crystal display device. The polarizing plate is generally configured by a polarizer which is typically composed of an oriented polyvinyl alcohol film having iodine or dye adhered thereto, and translucent protective films bonded to the front and back surfaces of the polarizer.

With recent expanding applications of the liquid crystal display device, there has been an increasing trend of large-sized and high-definition applications such as television set, and this has further pushed up a level of required quality of the polarizing plate. In particular, large-sized and high-definition liquid crystal display devices have increasingly been used outdoors and under various severe environments than before. From this point of view, in recent years, the polarizing plate used for the liquid crystal display device has been strongly demanded to improve the durability of the polarizer under high-temperature and high-humidity conditions.

Meanwhile, there have been known several methods of improving the durability of the polarizer, by controlling pH to acidify a layer provided between the polarizer protecting film and the polarizer. For example, JP-A-2003-165188 discloses a method of providing, between the polarizer protecting film and the polarizer, a layer which contains a polyester resin having a dissociative organic acid group, and JP-A-2004-12578 discloses a method of adding a hydroxycarboxylic acid-based compound having a substituent with a small number of carbon atoms, to the adhesive layer. JP-A-H06-265725 discloses a method of adding an antioxidant selected from phenolic compound, phosphorus-containing compound and sulfur-containing compound, to the adhesive layer.

On the other hand, JP-A-2011-118135 discloses addition of barbituric acid to the protective film.

SUMMARY OF THE INVENTION

Technical Problem

The present inventors, however, found out from our investigation on the method of controlling pH to acidify the layer between the polarizer-protecting film and the polarizer described in JP-A-2003-165188, that the durability under high-temperature and high-humidity conditions was improved, but the method was insufficient to fully improve the amount of change of transmittance of the polarizer to satisfy the recent required level.

The present inventors also found that, by using the hydroxycarboxylic acid-based compound described in JP-A-2004-12578, the durability of the polarizer under high-temperature and low-humidity conditions was degraded against expectation.

The present inventors further found that, according to the method of adding an antioxidant described in JP-A-H06-265725, the transmittance of the polarizer unfortunately degraded when the amount of addition of the antioxidant was increased aiming at improving the durability of the polarizer.

JP-A-2011-118135 certainly describes addition of barbituric acid to the protective film, but gives no description on addition of barbituric acid to the adhesive for bonding the protective film and the polarizer.

It is also understood that, even if the polarizer were durable enough under high-temperature and high-humidity conditions, the polarizing plate will not be convenient for use, if the adherence between the polarizer and the protective film is poor.

The present invention was conceived to solve the above-described problems, and the object of which is to provide a laminate containing a polarizer, which is excellent both in the durability of the polarizer under high-temperature and high-humidity conditions, and the adherence with the adjoining protective film and so forth.

Solution to Problem

The present inventors conducted thorough investigations to solve the above-described problems, and found out that elevation of cross transmittance of the polarizers after allowed to stand under high-temperature and high-humidity conditions was largely suppressed, and also that the amount of change in the single plate transmittance was suppressed to a low level, by providing an adhesive layer which contains a barbituric acid skeletal compound having an aromatic ring-containing polar substituent, adjoining to the polarizer. What was more surprising, the present inventors also found out that it was possible to improve the adherence between the polarizer and the polarizing plate protective film. These findings led us to complete the present invention.

<1> A laminate comprising a polarizer, and an adhesive layer adjoining to at least one surface of the polarizer, the adhesive layer containing a resin and at least one species selected from compounds represented by the formula (1) below and the formula (1-2) below, hydrate of the compounds, solvate of the compounds, and salt of the compounds;

Formula (1)

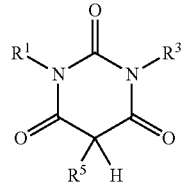

in the formula (1), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group or $C_{6-20}$ aromatic group, and $R^5$ represents a substituent;

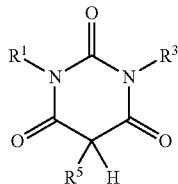

Formula (1-2)

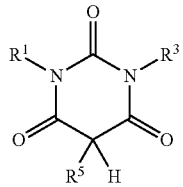

in the formula (1-2), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group, or, $C_{6-20}$ aromatic group, and $R^5$ represents a substituent; where at least one of $R^1$, $R^3$ and $R^5$ is a water-soluble group, or contains a water-soluble group, or both of $R^1$ and $R^3$ represent a hydrogen atom.

<2> The laminate of <1>, wherein the adhesive layer contains a resin and the compound represented by the formula (1), and $R^5$ represents a substituent having an aromatic ring and showing a polar effect.

<3> The laminate of <1> or <2>, wherein content of the compounds represented by the formula (1) and the formula (1-2), the hydrate of the compounds, the solvate of the compounds, and the salt of the compounds in the adhesive layer, exceeds 0.5% by mass and 50% by mass or less of the resin.

<4> The laminate of any one of <1> to <3>, wherein $R^5$ represents a $C_{6-20}$ aromatic group.

<5> The laminate of any one of <1> to <4>, wherein the resin is a water-soluble adhesive or a UV curable adhesive.

<6> A polarizing plate having a protective film on the surface of the adhesive layer of the laminate described in any one of <1> to <5>.

<7> The polarizing plate of <6>, wherein the protective film is a cellulose acylate film.

<8> A liquid crystal display device having the polarizing plate described in <6> or <7>.

<9> A method of manufacturing a polarizing plate, the method including bonding a polarizer to a protective film or to a substrate, using an adhesive or a pressure-sensitive adhesive which contains a resin and at least one species selected from compound represented by the formula (1) and formula (1-2) below, hydrate of the compounds, solvate of the compounds, and salt of the compounds;

Formula (1)

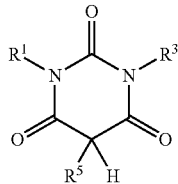

in the formula (1), each of $R^1$, $R^3$ and $R^5$ independently represents a hydrogen atom, $C_{1-20}$ straight-chain alkyl group, $C_{3-20}$ branched alkyl group, $C_{3-20}$ cycloalkyl group, $C_{2-20}$ alkenyl group or $C_{6-20}$ aromatic group, and $R^5$ represents a substituent;

Advantageous Effects of Invention

The present invention is successful to provide a polarizing plate improved in the durability of the polarizer under high-temperature and high-humidity conditions, single plate transmittance and adherence, and a liquid crystal display device using the same.

DESCRIPTION OF EMBODIMENTS

Figure 1:
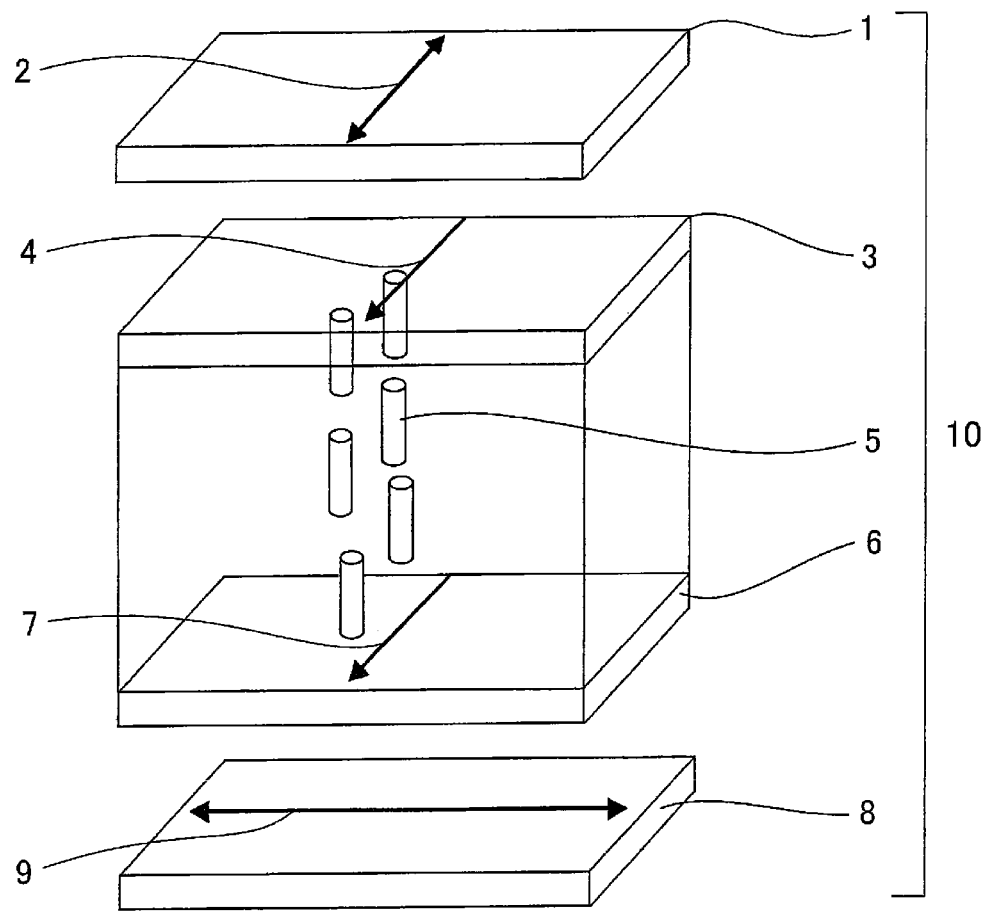
FIG. 1 is an exemplary schematic drawing illustrating an example of the liquid crystal display device of the present invention.

The present invention will be detailed below. Note in this specification that the wording "to" with preceding and succeeding numerals is used for indicating a numerical range including the lower and upper limits thereof respectively given by these numerals.

[Laminate]

The laminate of the present invention has a polarizer, and an adhesive layer adjoining to at least one surface of the polarizer. The adhesive layer contains a resin and at least one species selected from compound represented by the formula (1) and the formula (1-2) below, hydrate of the compounds, solvate of the compounds, and salt of the compounds (these species may occasionally be referred to as "compound, etc. represented by the formula (1)", hereinafter).

Formula (1)

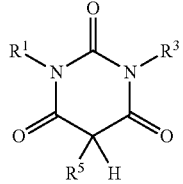

In the formula (1), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group or $C_{6-20}$ aromatic group, and $R^5$ represents a substituent.

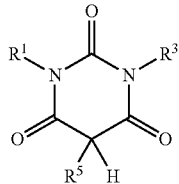

Formula (1-2)

In the formula (1-2), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group, or $C_{6-20}$ aromatic group, and $R^5$ represents a substituent; where at least $R^1$, $R^3$ and $R^5$ is a water-soluble group, or contains a water-soluble group, or both of $R^1$ and $R^3$ represent a hydrogen atom.

The laminate of the present invention is configured by a polarizer, and an adhesive layer adjoining to at least one surface of the polarizer. The polarizer is usable as a polarizer plate, after bonded to a polarizing plate protective film (translucent protective film, in general), retardation film, or to a substrate of the liquid crystal cell using a pressure sensitive adhesive layer or adhesive layer.

By using the laminate of the present invention, elevation of the transmittance of the polarizer after allowed to stand under high-temperature and high-humidity conditions is largely suppressed, and the amount of change in the single plate transmittance is suppressed. It is also made possible to improve the adherence between the polarizer and the polarizing plate protective film.

<Adhesive Layer>

The adhesive layer in the present invention contains a resin, and at least one species selected from compound represented by the formula (1) and the formula (1-2), hydrate of the compounds, solvate of the compounds, and salt of the compounds, and adjoins at least one surface of the polarizer. The adhesive layer is preferably provided to both surfaces of the polarizer.

The laminate of the present invention has an adhesive layer, in which the polarizer is bonded to the polarizing plate protective film and various substrates, while placing the adhesive layer in between.

<<Compound Represented by Formula (1)>>

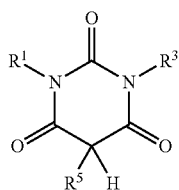

Formula (1)

In the formula (1), each of $R^1$ and $R^3$ independently represents a hydrogen atom, $C_{1-20}$ straight-chain alkyl group, $C_{3-20}$ branched alkyl group, $C_{3-20}$ cycloalkyl group, $C_{2-20}$ alkenyl group or $C_{6-20}$ aromatic group, and $R^5$ represents a substituent.

By using the compound represented by the formula (1) in the adhesive layer, the laminate of the present invention, when used as the polarizing plate and allowed to stand under high-temperature and high-humidity conditions, is improved in the durability of the polarizer and the single plate transmittance to a considerable degree. Also the adherence with the polarizing plate may be improved.

One possible event relevant to the subject of the present invention is photo-degradation. A known mechanism causing the photo-degradation is that a strong energy beam such as ultraviolet radiation is absorbed by the resin composing the polarizing plate, and thereby the resin is decomposed.

When radical is produced in the process of decomposition, the thus-produced radical is suspected to decompose the surrounding resin in a chain-like manner to thereby accelerate the decomposition. It is therefore desired to stabilize the radical so as to suppress the decomposition reaction.

To cope with the radical, one possible mechanism of scavenging and stabilizing iodine radical or radical originated from the resin, induced by energy beam such as ultraviolet radiation, is contributed by a carbon atom having bound thereto the substituent represented by $R^5$ in the formula (1) in the present invention, showing a polar effect. What is more better, barbituric acid which configures the skeleton of the formula (1) shows acidity which is contributive to stabilize the polarizer, and this supposedly ensures a distinct effect.

Preferable ranges of $R^1$ and $R^3$ in the formula (1) will be described.

The $C_{1-20}$ straight-chain alkyl group or $C_{3-20}$ branched alkyl group is preferably a $C_{1-10}$ straight-chain alkyl group or $C_{3-20}$ branched alkyl group, more preferably a $C_{1-5}$ straight-chain alkyl group or $C_{3-5}$ branched alkyl group, furthermore preferably a $C_{1-3}$ straight-chain alkyl group, and particularly a methyl group or ethyl group.

The $C_{3-20}$ cycloalkyl group is preferably a $C_{3-10}$ cycloalkyl group, and more preferably a $C_{4-8}$ cycloalkyl group. The cycloalkyl group is specifically exemplified by cyclopropyl group, cyclopentyl group and cyclohexyl group, wherein cyclohexyl group is particularly preferable. The cycloalkyl group herein means a cyclic alkyl group.

The $C_{2-20}$ alkenyl group is preferably a $C_{2-10}$ alkenyl group, and more preferably a $C_{2-5}$ alkenyl group.

The $C_{6-20}$ aromatic group may be an aromatic hydrocarbon group or aromatic heterocyclic group, where the aromatic hydrocarbon group is more preferable. The aromatic hydrocarbon group is preferably a phenyl group or naphthyl group, where phenyl group is more preferable.

Each of $R^1$ and $R^3$ may have a substituent. The substituent is not specifically limited, and is exemplified by alkyl group (preferably $C_{1-10}$ ones, such as methyl group, ethyl group, isopropyl group, t-butyl group, pentyl group, heptyl group, 1-ethylpentyl group, benzyl group, 2-ethoxyethyl group, 1-carboxymethyl group, etc.), alkenyl group (preferably $C_{2-20}$ ones, such as vinyl group, allyl group, oleyl group, etc.), alkynyl group (preferably $C_{2-20}$ ones, such as ethynyl group, butadienyl group, phenylethynyl group, etc.), cycloalkyl group (preferably $C_{3-20}$ ones, such as cyclopropyl group, cyclopentyl group, cyclohexyl group, 4-methylcyclohexyl group, etc.), aryl group (preferably $C_{6-26}$ ones, such as phenyl group, 1-naphthyl group, 4-methoxyphenyl group, 2-chlorophenyl group, 3-methylphenyl group, etc.), heterocyclic group (preferably $C_{0-20}$ ones, preferably having oxygen atom, nitrogen atom or sulfur atom as a hetero atom composing the ring, may be 5- or 6-membered ring occasionally condensed with a benzene ring or heterocycle, the ring may be saturated ring, unsaturated ring or aromatic ring, such as 2-pyridyl group, 4-pyridyl group, 2-imidazolyl group, 2-benzoimidazolyl group, 2-thiazolyl group, 2-oxazolyl group, etc.), alkoxy group (preferably $C_{1-20}$ ones, such as methoxy group, ethoxy group, isopropyloxy group, benzyloxy group, etc.), aryloxy group (preferably $C_{6-26}$ ones, such as phenoxy group, 1-naphthyloxy group, 3-methylphenoxy group, 4-methoxyphenoxy group, etc.), alkylthio group (preferably $C_{1-20}$ ones, such as methylthio group, ethylthio group, isopropylthio group, benzylthio group, etc.), arylthio group (preferably $C_{6-26}$ ones, such as phenylthio group, 1-naphthylthio group, 3-methylphenylthio group, 4-methoxyphenylthio group, etc.), acyl group (containing alkylcarbonyl group, alkenylcarbonyl group, arylcarbonyl group or heterocyclic carbonyl group, preferably $C_{20}$ or shorter, such as acetyl group, pivaloyl group, acryloyl group, methacryloyl group, benzoyl group, nicotinoyl group, etc.), aryloylalkyl group, alkoxycarbonyl group (preferably $C_{2-20}$ ones, such as ethoxycarbonyl group, 2-ethylhexyloxycarbonyl group, etc.), aryloxycarbonyl group (preferably $C_{7-20}$ ones, such as phenyloxycarbonyl group, naphthyloxycarbonyl group, etc.), amino group (containing amino group, alkylamino group, arylamino group or heterocyclic amino group, preferably $C_{0-20}$ ones, such as amino group, N,N-dimethylamino group, N,N-diethylamino group, N-ethylamino group, anilino group, 1-pyrrolidinyl group, piperidino group, morphonyl group, etc.), sulfonamide group (preferably $C_{0-20}$ ones, such as N,N-dimethylsulfonamide group, N-phenylsulfonamide group, etc.), sulfamoyl group (preferably $C_{0-20}$ ones, such as N,N-dimethylsulfamoyl group, N-phenylsulfamoyl group, etc.), acyloxy group (preferably $C_{1-20}$ ones, such as acetyloxy group, benzoyloxy group, etc.), carbamoyl group (preferably $C_{1-20}$ ones, such as N,N-dimethylcarbamoyl group, N-phenylcarbamoyl group, etc.), acylamino group (preferably $C_{1-20}$ ones, such as acetylamino group, acryloylamino group, benzoylamino group, nicotinamide group, etc.), cyano group, hydroxy group, mercapto group, and halogen atom (for example, fluorine atom, chlorine atom, bromine atom, iodine atom, etc.). The substituents which may be owned by $R^1$ and $R^3$ may further have the above-described substituents.

Among the above-described substituents which may be owned by $R^1$ and $R^3$, preferable are alkyl group, aryl group, alkoxy group and acyl group.

Preferable examples of the compounds represented by the formula (1) are the followings.

Compounds with at least one of $R^1$, $R^3$ and $R^5$ representing a substituent showing a polar effect.

Compounds with either $R^1$ or $R^3$ representing an aralkyl group

Aralkyl group means alkyl group having aryl group(s) substituted thereon. Among the aralkyl groups, those having one or two aryl groups substituted on the alkyl group are preferable (two aryl groups, if any, preferably substitute on the same carbon atom). Alkyl group may also have aryl group and acyl group (preferably aryloyl group) substituted thereon.

Compounds with either $R^1$ or $R^3$ representing a cycloalkyl group-containing group which is preferably a cycloalkyl group Compounds with each $R^1$ and $R^3$ representing a hydrogen atom, in particular, with each of $R^1$ and $R^3$ representing a hydrogen atom, and $R^5$ representing a $C_{1-3}$ alkyl group.

$R^5$ represents a substituent. The substituent is not specifically limited, and is represented by those having been exemplified as the substituents owned by $R^1$ and $R^3$. $R^5$ is preferably an alkyl group (preferably $C_{1-3}$ alkyl group), aryl group or aralkyl group, more preferably aryl group or aralkyl group, and furthermore preferably phenyl group or benzyl group.

In particular in the present invention, $R^5$ is more preferably a substituent having an aromatic ring and showing a polar effect. These groups may further be substituted by another substituent. The substituent having an aromatic ring represented by $R^5$ preferably has a structure showing a polar effect, so as to contribute to scavenge and stabilize the radicals. While the structure showing a polar effect may be embodied by any substituent showing a polar effect, $R^5$ now preferably represents a substituent having an aromatic ring and showing a polar effect.

This sort of substituent having an aromatic ring and showing a polar effect is preferably a $C_{6-20}$ aromatic group or $C_{7-20}$ aralkyl group, more preferably a $C_{6-14}$ aromatic group or $C_{7-15}$ aralkyl group, and still more preferably a $C_{6-10}$ aromatic group or $C_{7-11}$ aralkyl group. The number of carbon atoms referred to herein represents the total number of carbon atoms. Aralkyl group means alkyl group having aryl group(s) substituted thereon. Among the aralkyl groups, those having one or two aryl groups substituted on the alkyl group are preferable (two aryl groups, if any, preferably substitute on the same carbon atom). The substituent having an aromatic ring and showing a polar effect is exemplified by phenyl group, naphthyl group, anthracenyl group, benzyl group, and diphenylmethyl group.

$R^5$ is exemplified by phenyl group, p-chlorophenyl group, p-tolyl group, benzyl group, ethylphenyl group, m-tolyl group, p-methoxyphenyl group, p-trifluoromethylphenyl group, p-methylbenzyl group, diphenylmethyl group, and methylbenzoyl phenylmethyl group. Preferably, exemplified are p-chlorophenyl group, p-tolyl group, ethylphenyl group, m-tolyl group, p-methoxyphenyl group, p-trifluoromethylphenyl group, p-methylbenzyl group, and methylbenzoyl phenylmethyl group.

<<Compound Represented by Formula (1-2)>>

As described above, in the present invention, the compound represented by the formula (1-2) is usable in place of the compound represented by the formula (1), or together with the compound represented by the formula (1). As the barbituric acid in the present invention, the compound represented by the formula (1-2) is exemplified by a compound with at least one of $R^1$, $R^3$ and $R^5$ representing a water-soluble group, or a compound substituted with a water-soluble group. Any other moieties are synonymous to those in the formula (1), again with the same preferable ranges.

The water-soluble group is a group contributive to water solubility of the compound represented by the formula (1-2), and is exemplified by sulfo group (or salt thereof), carboxy group (or salt thereof), hydroxy group, mercapto group, amino group, ammonio group, sulfonamide group, acylsulfamoyl group, sulfonylsulfamoyl group, activated methine group, and substituent containing any of these groups. Preferable examples include sulfo group (or salt thereof), carboxy group (or salt thereof), hydroxy group, and amino group.

The carboxy group, sulfonamide group and sulfo group may exist in the form of salt, wherein examples of the counter ion which forms the salt include ammonium ion, alkaline metal ion (for example, lithium ion, sodium ion, potassium ion) and organic cation (for example, tetramethylammonium ion, tetramethylguanidium ion, tetramethylsulfonium ion). Among these counter ions, alkali metal ion is preferable.

In one embodiment in which the compound, usable in the present invention and represented by the formula (1-2), is given water solubility, both of $R^1$ and $R^3$ may be a hydrogen atom. With this configuration, the water solubility is improved.

<<Hydrate, Solvate or Salt>>

In the present invention, each of the compound represented by the formula (1) and the compound represented by the formula (1-2) may be used in the form of hydrate, solvate or salt. In the present invention, the hydrate may contain organic solvent, and the solvate may contain water. In other words, the "hydrate" and "solvate" include "mixed solvate" containing both of water and organic solvent.

Examples of the solvent possibly contained in the solvate include any of general organic solvents. Specific examples include alcohols (such as methanol, ethanol, 2-propanol, 1-butanol, 1-methoxy-2-propanol and t-butanol), esters (such as ethyl acetate), hydrocarbons (both of aliphatic and aromatic hydrocarbons are acceptable, such as toluene, hexane and heptane), ethers (such as diethyl ether and tetrahydrofuran), nitriles (such as acetonitrile), and ketones (such as acetone and 2-butanone). Alcoholic solvate is preferable, which more preferably contains methanol, ethanol, 2-propanol or 1-butanol. These solvents may be any of reaction solvents used for synthesizing the compound represented by the formula (1), may be solvents used for crystallization and purification after the synthesis, or may be mixtures of them.

Two or more species of solvents may concurrently be contained, or water and solvent may be contained together (for example, water and alcohol (such as methanol, ethanol, and t-butanol)).

The salt includes acid addition salt composed of an inorganic or organic acid. The inorganic acid is exemplified by hydrohalogenic acids (hydrochloric acid, hydrobromic acid), sulfuric acid and phosphoric acid. The organic acid is exemplified by acetic acid, trifluoroacetic acid, oxalic acid and citric acid, and further by alkanesulfonic acids (methanesulfonic acid), and arylsulfonic acids (benzenesulfonic acid, 4-toluenesulfonic acid, 1,5-naphthalenedisulfonic acid).

The salt is exemplified by those formed when the acidic moiety in the parent compound is substituted by a metal ion (such as alkali metal salt including sodium and potassium salts, alkali earth metal salt including calcium and magnesium salts, ammonium salt, alkali metal ion, alkali earth metal ion, and aluminum ion), or when prepared using an organic base (ethanolamine, diethanolamine, triethanolamine, morpholine, piperidine), but not limited thereto. Among them, sodium salt and potassium salt are preferable.

In the present invention, the salt of the compound represented by the formula (1) or the compound represented by the formula (1-2) typically exist in the form of tautomers given by the formula below. Note that the tautomers are assumed as identical in the present invention, without discriminating them, and are represented by either one structure in specific examples.

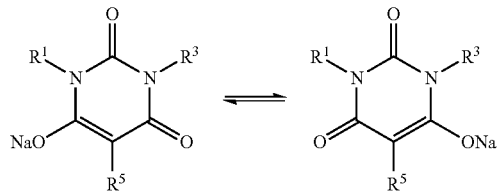

When the compound, etc. represented by the formula (1) is incorporated into the adhesive layer, the compound, etc. represented by the formula (1) is preferably substituted with a substituent which shows a polar effect, from the viewpoint of compatibility with the adhesive layer. With such compound, the present inventors suppose that the compound diffuses from the adhesive layer into the polarizer layer, and this makes it possible to exhibit an effect of improving durability of the polarizer. The present inventors also suppose that the compound also diffuses from the adhesive layer into the protective film layer, so as to enhance adherence between the layers.

Each of the compound represented by the formula (1), the compound represented by the formula (1-2), the hydrate of the compounds, the solvate of the compounds, and the salt of the compounds preferably has a molecular weight of 125 to 2,000, more preferably 200 to 1,500, furthermore preferably 250 to 1,000, and particularly 350 to 800.

If the molecular weight is 125 or larger, the compound will successfully be suppressed from vaporizing or leaching out from the film, meanwhile if the molecular weight is 2,000 or less, the compound will have a sufficient level of compatibility with the resin, and thereby the haze will successfully be suppressed from increasing.

Degree of hydrophilicity of the compound represented by the formula (1), the compound represented by the formula (1-2) below, the hydrate of the compounds, the solvate of the compounds, and the salt of the compounds may be represented by Log P value. P in Log P represents a partition coefficient in an n-octanol/water system, and is measurable using n-octanol and water. The partition coefficient may alternatively be determined as an estimated C log P value, using C log P value estimation program (C LOG P program installed on PC Models from Daylight Chemical Information Systems, Inc.). The C log P is preferably −8.0 to 12.0, more preferably −5.0 to 10.0, and furthermore preferably −5.0 to 8.0. If the C log P value is adjusted in these ranges, the compound will have a sufficient level of compatibility with the resin. Specific examples of the compound, etc. represented by the formula (1) will be shown below, without limiting the present invention. In the compounds shown below, Me represents a methyl group.

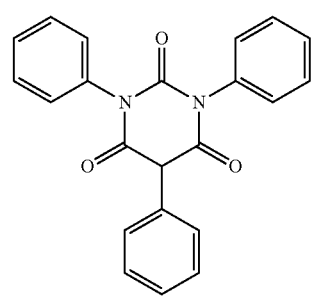

A-1

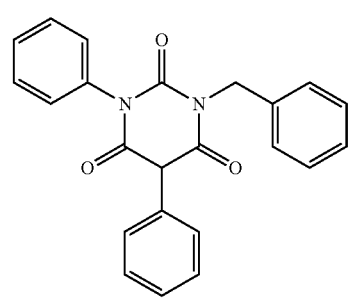

A-2

-continued
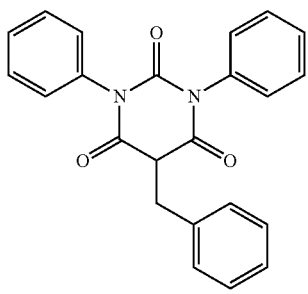
A-3
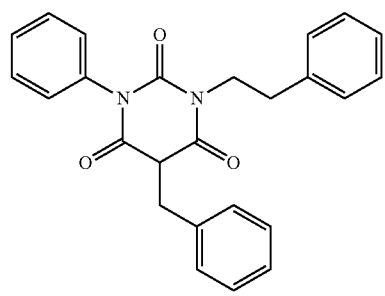
A-8
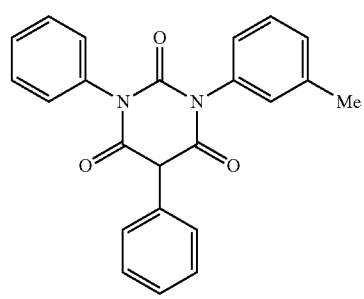
A-9
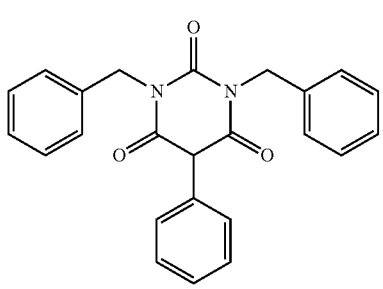
A-4
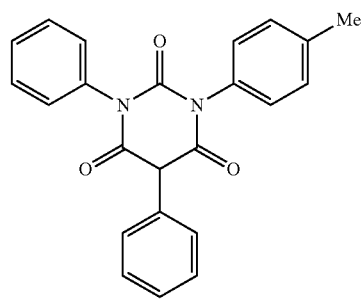
A-10
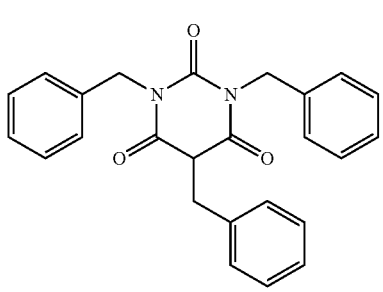
A-5
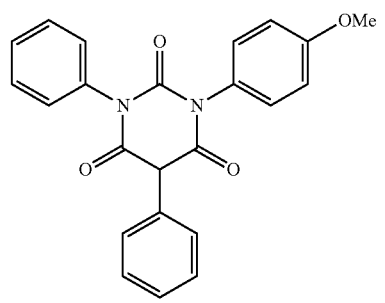
A-11
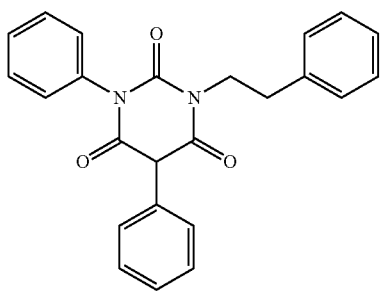
A-6
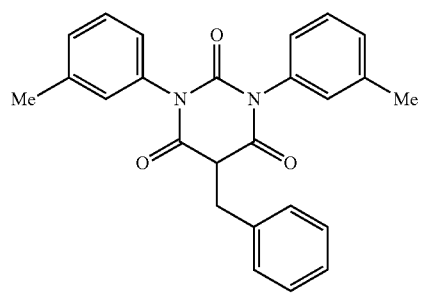
A-12
A-7

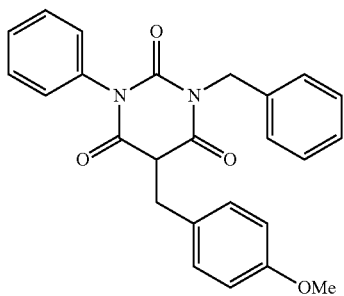
A-13
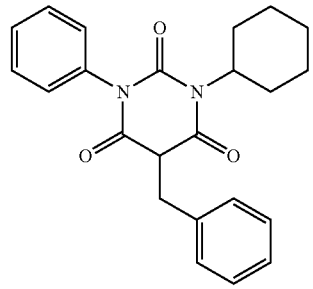
A-18
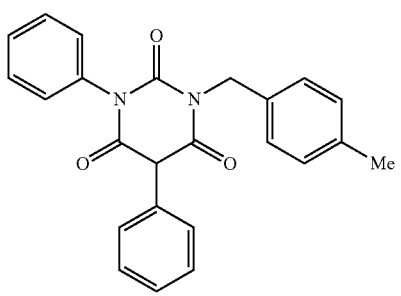
A-14
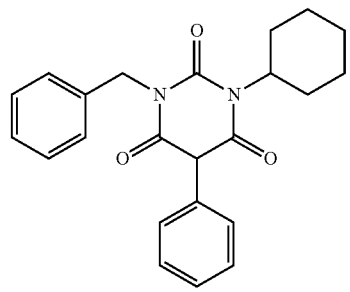
A-19
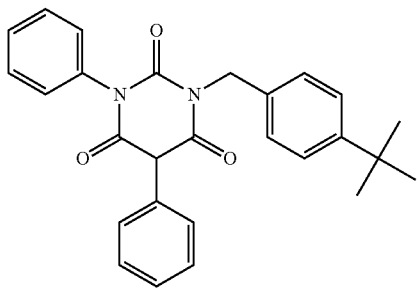
A-15
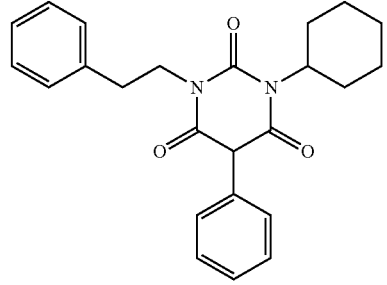
A-20
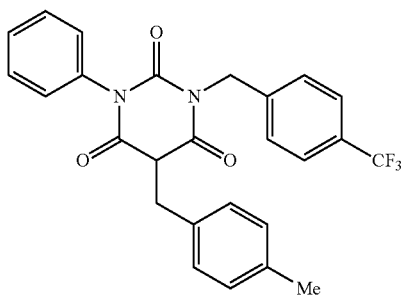
A-16
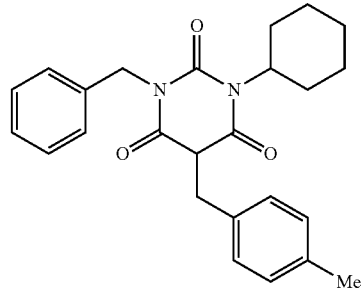
A-21
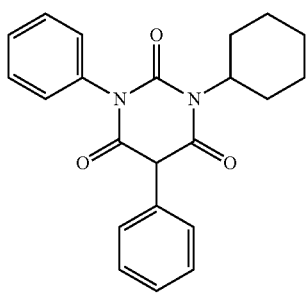
A-17
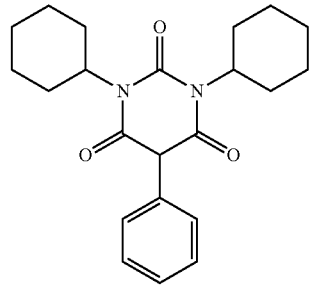
A-22

-continued
A-23 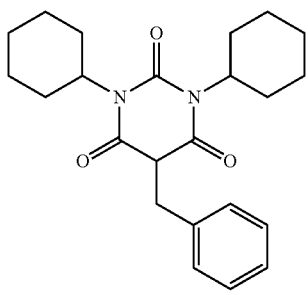
A-24 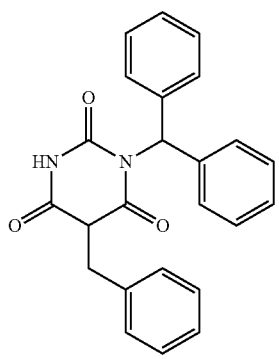
A-25 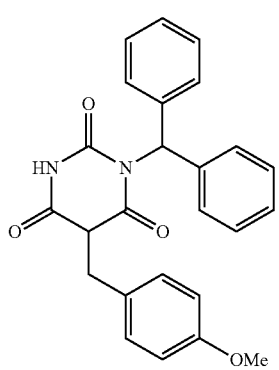
A-26 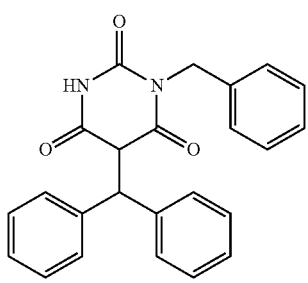
A-27 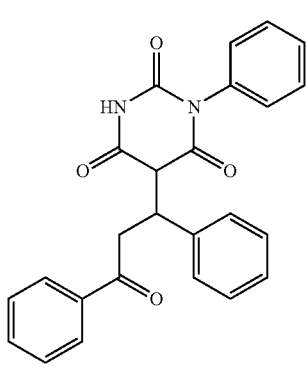
-continued
A-28 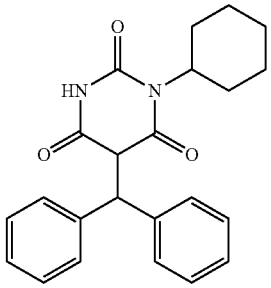
A-29 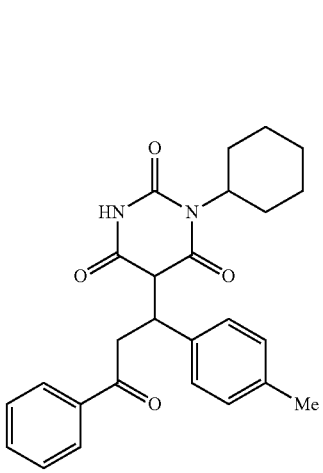
A-30 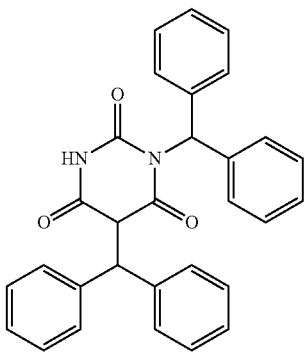
A-31 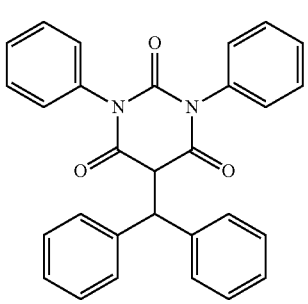

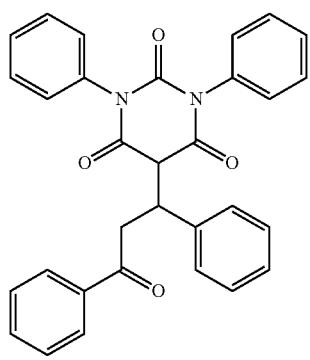
(A-32)
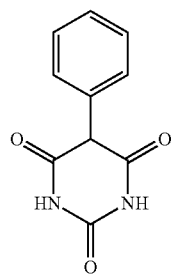
(A-33)
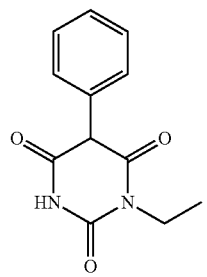
(A-34)
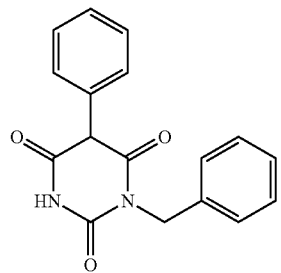
(A-35)
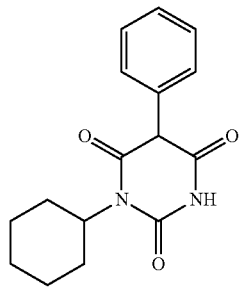
(A-36)
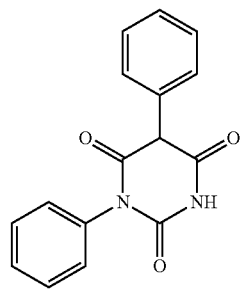
(A-37)
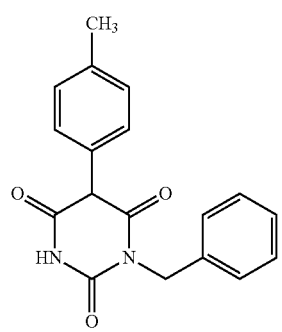
(A-38)
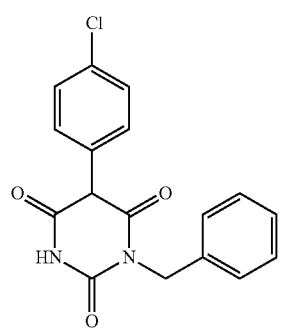
(A-39)
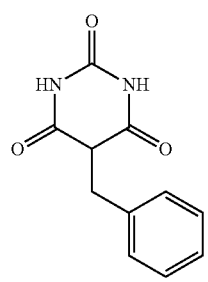
(A-40)
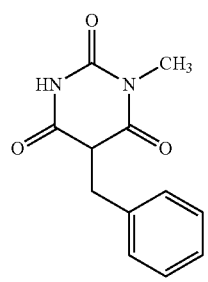
(A-41)

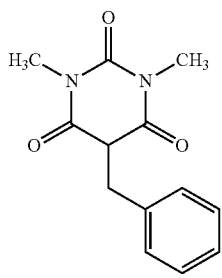 (A-42)
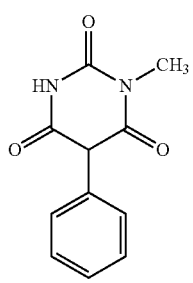 (A-43)
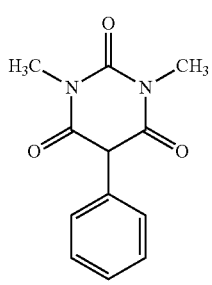 (A-44)
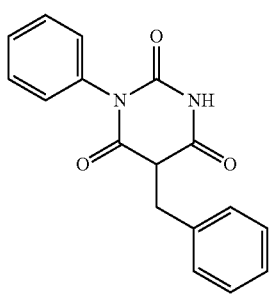 (A-45)
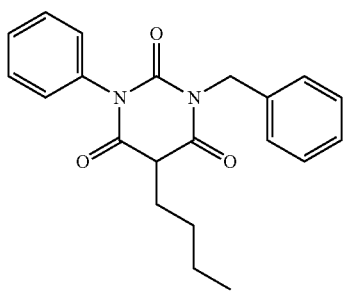 (A-46)
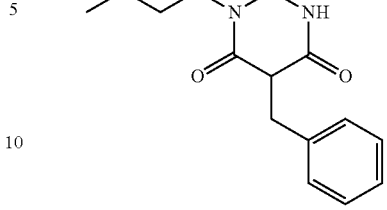 (A-47)
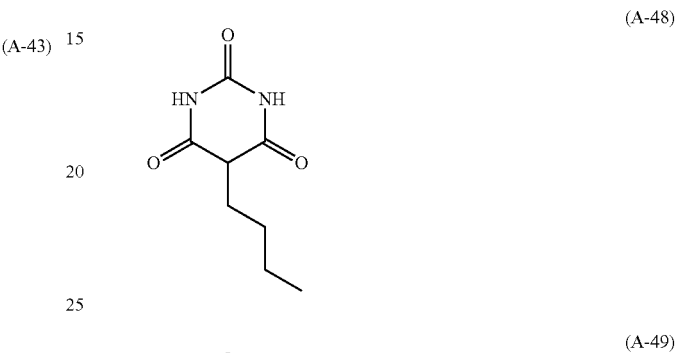 (A-48)
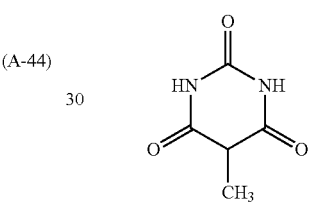 (A-49)
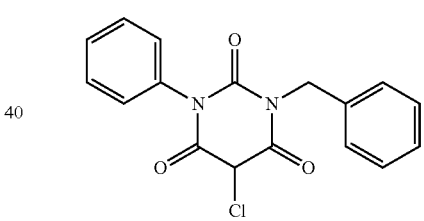 (A-50)
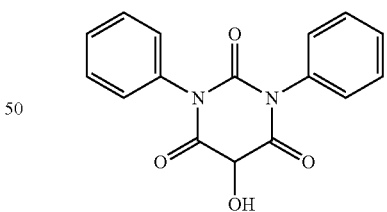 (A-51)
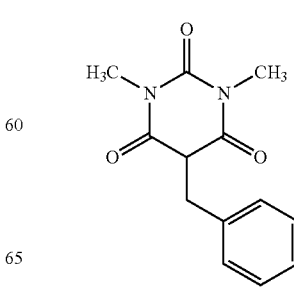 (A-52)

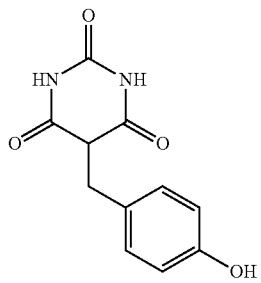
(A-53)
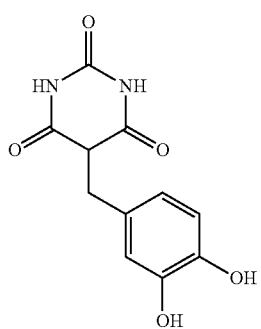
(A-54)
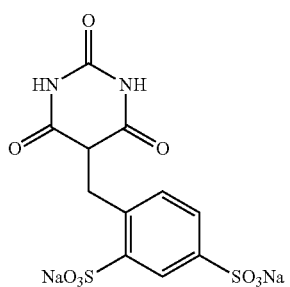
(A-55)
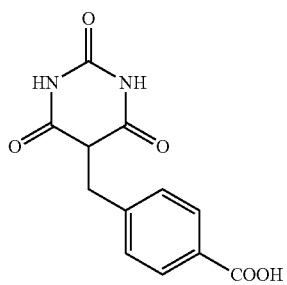
(A-56)
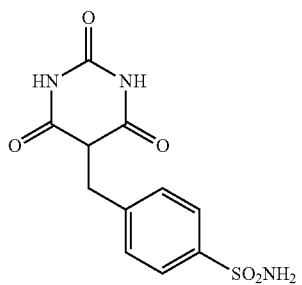
(A57)
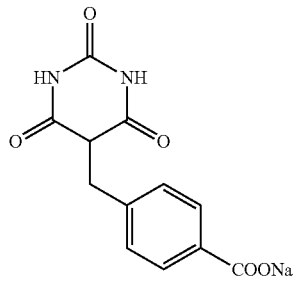
(A-58)
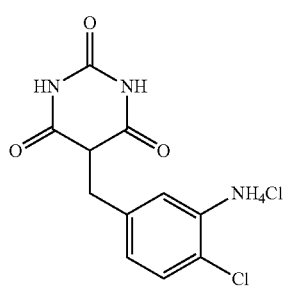
(A-59)
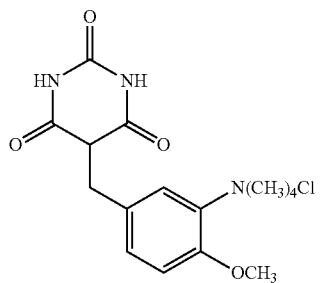
(A-60)
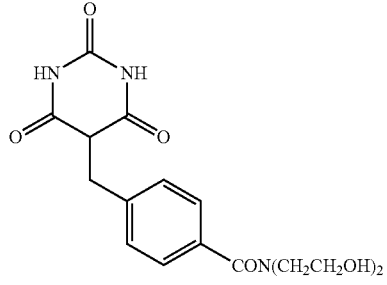
(A-61)
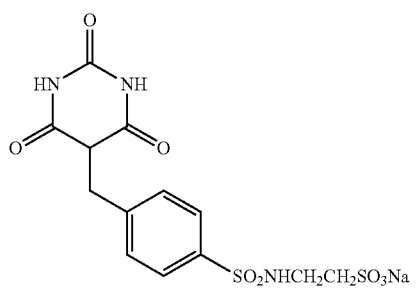
(A-62)

(A-63)
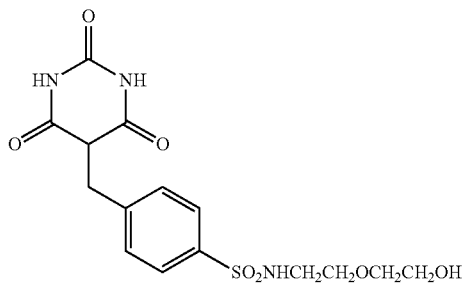
(A-64)
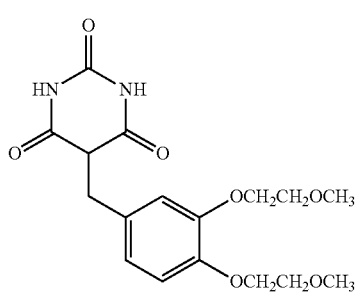
(A-65)
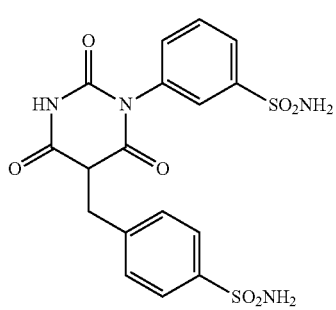
(A-66)
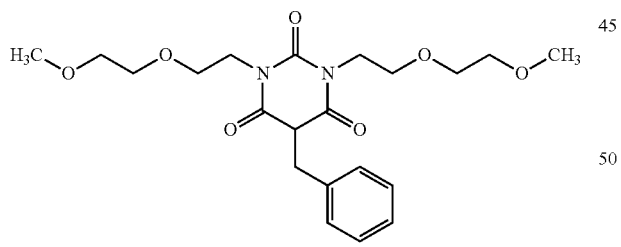
(A-67)
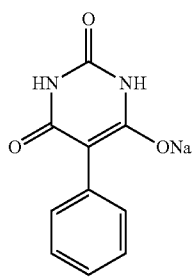
(A-68)
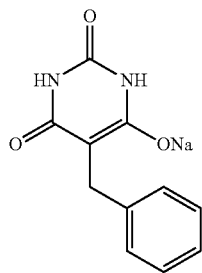
(A-69)
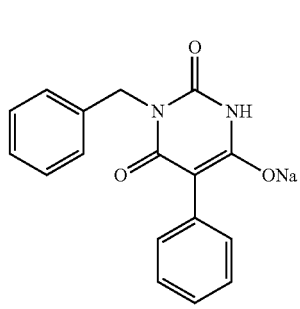
(A-70)
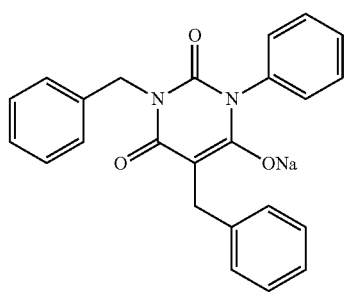
(A-71)
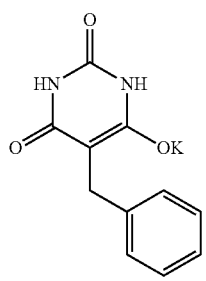
(A-72)
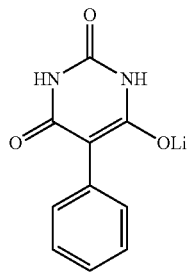

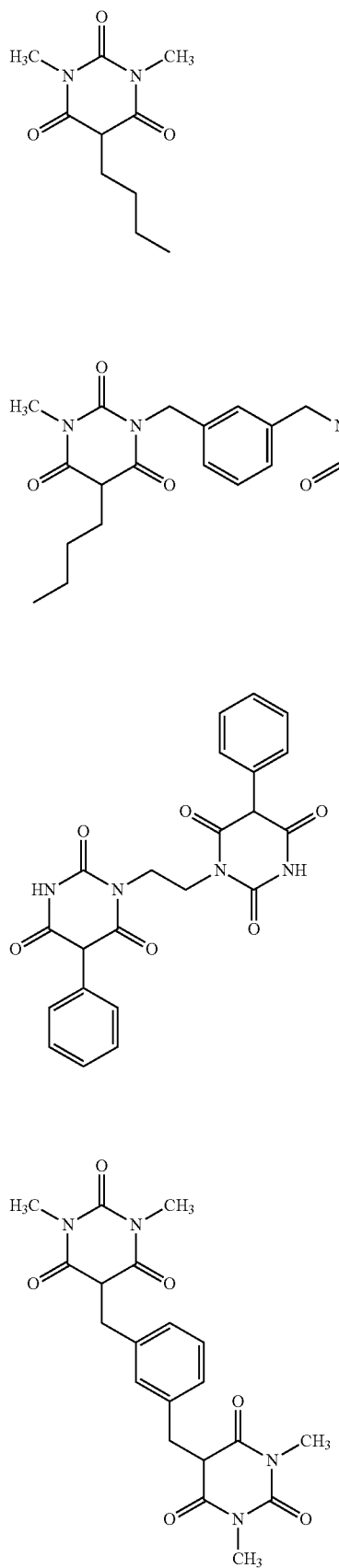
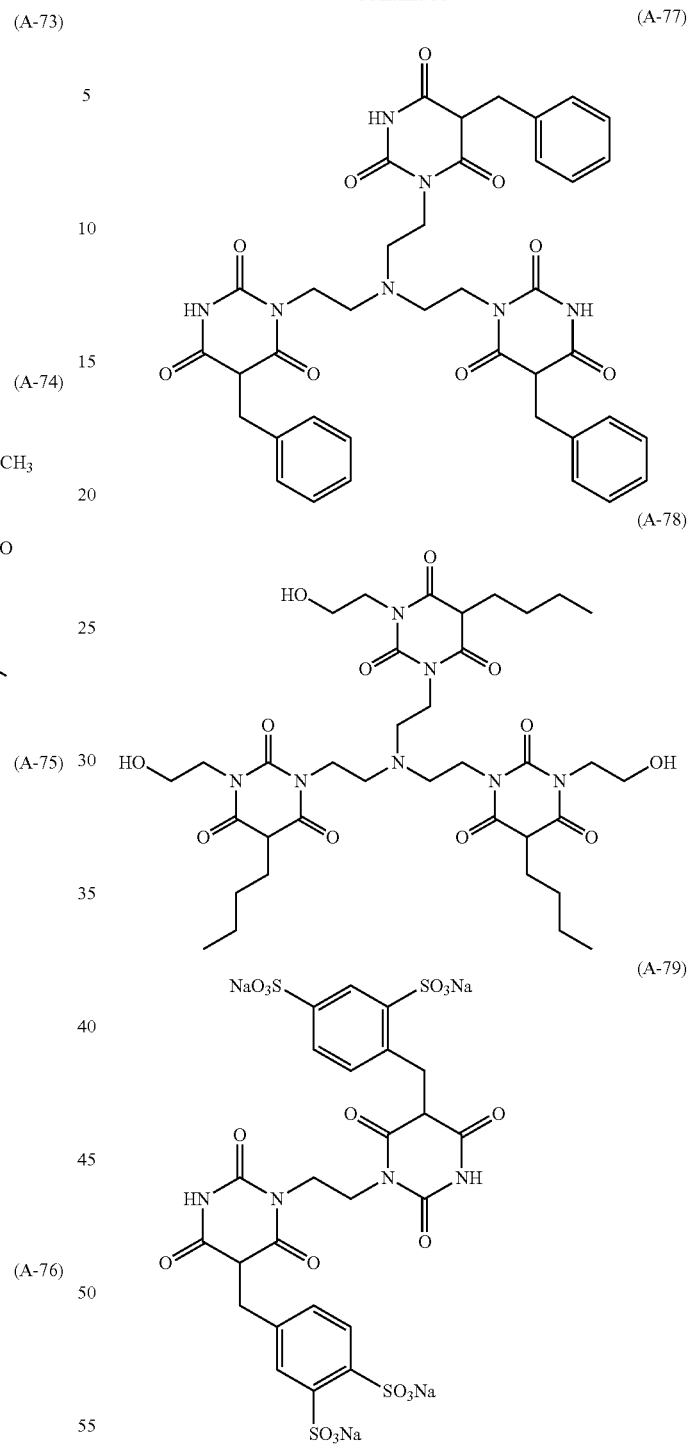

The compound represented by the formula (1) and the compound represented by the formula (1-2) are known to be synthesized by a method of synthesizing barbituric acid, based on condensation of an urea derivative with a malonic acid derivative. Barbituric acid having two substituents on the N atoms may be obtained by heating a N,N'-disubstituted urea with malonyl chloride, or by heating with a combination of malonic acid and an activator such as acetic anhydride. For example, methods described in *Journal of the American Chemical Society*, vol. 61, p. 1015 (1939), *Journal of Medici-* nal *Chemistry*, vol. 54, p. 2409 (2011), *Tetrahedron Letters*, vol. 40, p. 8029 (1999), and WO2007/150011 are preferably used.

Both unsubstituted and substituted malonic acids are acceptable for use in the condensation. By using malonic acid having any of correspondent substituents for $R^5$ so as to configure barbituric acid, the compounds represented by the formula (1) may be synthesized. The compound represented by the formula (1) and the compound represented by the formula (1-2) may be synthesized alternatively by modifying barbituric acid unsubstituted at the 5-position, which is obtainable by condensing unsubstituted malonic acid with an urea derivative.

The 5-position may be modified by a nucleophilic substitution reaction with a halogenated alkyl compound, or by an addition reaction such as the Michael addition reaction. Also a method using dehydrating condensation with an aldehyde or ketone to produce an alkylidene or arylidene compound, and then reducing the double bond is preferably used. The methods preferably used herein are described, for example, *Organic Letters*, 5, p. 2887 (2003), *Journal of Medicinal Chemistry*, 17, p. 1194 (1974), *Journal of Organic Chemistry*, 68, p. 4684 (2003), *Tetrahedron Letters*, 42, p. 4103 (2001), *Journal of the American Chemical Society*, 119, p. 12849 (1997), and *Tetrahedron Letters*, 28, p. 4173 (1987).

Methods of synthesizing the compound represented by the formula (1) and the compound represented by the formula (1-2) usable in the present invention are not limited to those described above.

Content of the compound, etc. represented by the formula (1) is 0.01 to 30 parts by mass relative to the resin, more preferably 0.01 to 10 parts by mass, and furthermore preferably 1 to 10 parts by mass. If the content exceeds 0.01% by mass, an effect of improving the durability of the polarizer will be obtained more easily, meanwhile if the content is 30% by mass or less, the compound will be fully compatible with the resin, and this preferably contributes to keep the resin translucent.

When a plurality of compounds, etc. represented by the formula (1) are used in combination, it suffices that the total content falls in the above-descried ranges.

The compound, etc. represented by the formula (1) may be eccentrically located within the adhesive layer. In particular, in view of more effectively exhibiting the effect of improving durability of the polarizer, the compound, etc. represented by the formula (1) preferably located in the adhesive layer more densely in the polarizer side.

<<Resin Used for Adhesive Layer>>

The resin used for the adhesive layer is not specifically limited so long as it is compatible with the compound, etc. represented by the formula (1), and has a function of bonding. The style of bonding of the adhesive layer is again not limited, for which a viscous pressure sensitive adhesive may be used, or an adhesive which expresses adherence by drying or reaction may be used. The adhesive layer in the present invention means both of those composed of adhesive and pressure-sensitive adhesive.

The adhesive layer in the present invention is mainly composed of a resin which generally accounts for 50% by mass or more, and preferably 70% by mass or more, of the adhesive layer. The resin may be a mixture composed of a plurality of resins. The mixture is exemplified by a mixture of components having nearly the same structure of the main backbone, such as a polymer mixture obtained by partially modifying the resin, or a resin synthesized by allowing different monomers to react with each other. For the resin composed of a mixture, it suffices that the total amount of the ingredients falls within the above-described ranges.

The adhesive layer is formed typically by coating a coating liquid, which contains a predetermined ratio of an adhesive, onto the surface of at least either the polarizing plate protective film or the polarizer, followed by drying. The coating liquid may be prepared arbitrarily by an appropriate method. The coating liquid may be a commercially available solution or dispersion. The commercially available solution or dispersion may further be added with a solvent, or a solid component may be used by dissolving or dispersing it into various solutions.

The adhesive usable herein is arbitrarily selectable from those having appropriate properties, product forms, and adhesion mechanism, depending on purposes. Specific examples of the adhesive include water-soluble adhesive, UV-curable adhesive, emulsion-type adhesive, latex-type adhesive, mastic adhesive, double-layered adhesive, pasty adhesive, foaming adhesive, supported film adhesive, thermoplastic adhesive, hot-melt adhesive, thermo-curing adhesive, hot-melt adhesive, thermo-activated adhesive, heat sealing adhesive, thermosetting adhesive, contact-type adhesive, pressure sensitive adhesive, polymerizable adhesive, solvent adhesive, and solvent activated adhesive. Among them, water-soluble adhesive and UV-curable adhesive are preferable. For the specific case where the polarizer-adjoining layer in the polarizing plate of the present invention is an adhesive layer composed of an adhesive, preferably used is the water-soluble adhesive which is notable among these products for its excellent translucency, adherence, workability, quality of product and economy.

<<<Water-Soluble Adhesive>>>

The water-soluble adhesive may typically contain at least either one of water-soluble natural polymer and synthetic polymer. The natural polymer is exemplified by protein and starch. The synthetic polymer is exemplified by resol resin, urea resin, melamine resin, polyethylene oxide, polyacrylamide, polyvinylpyrrolidone, acrylic ester, methacrylate ester, and polyvinyl alcohol-based resin. Among them, the water-soluble adhesive containing polyvinyl alcohol-based resin is preferably used. In particular, for the polarizing plate of the present invention, the polarizer-adjoining layer preferably contains the water-soluble adhesive containing the polyvinyl alcohol-based resin which is very excellent in the adherence with the polarizer and also excellent in the adherence with the polarizing plate protective film.

The adhesive is also not limited in the style of adhesion. The adhesive may be a viscous pressure sensitive adhesive, or may be an adhesive which expresses adherence by drying or reaction.

Any arbitrary and appropriate pressure sensitive adhesives is usable. Specific examples of the pressure sensitive adhesive include solvent pressure sensitive adhesive, nonaqueous emulsion-type pressure sensitive adhesive, aqueous pressure sensitive adhesive, and hot-melt pressure sensitive adhesive. Among them, for the specific case where the adhesive layer is composed of the pressure sensitive adhesive, solvent pressure sensitive adhesives which uses acrylic polymers as the base polymer are preferably used. This is because they can exhibit appropriate adhesive properties with respect to the polarizer and the polarizing plate protective film (wettability, cohesiveness, adherence, etc.), and are excellent in optical translucency, weather resistance and heat resistance.

<<Metal Compound Colloid>>

The water-soluble adhesive may contain a metal compound. In particular, the water-soluble adhesive containing a polyvinyl alcohol-based resin or the like preferably contains a metal compound colloid, from the viewpoint of improving the durability of the polarizer under high humidity. This is because "knick", which is a local irregular defect possibly occurs at the interface between the polarizer and the polarizing plate protective film, may be prevented from occurring, and this successfully prevents water derived from environmental moisture from intruding into the polarizer, when the polarizing plate is subjected to durability test under high humidity.

The metal compound colloid may be any of those having metal compound particles dispersed in a dispersion medium, or may be any of those permanently stabilized through electrostatic stabilization of particles based on repulsion of the same electrical charge. While not specifically limited, the average particle size of the particles composing the metal compound preferably falls in the range from 1 to 100 nm, more preferably from 1 to 50 nm, and particularly 2 to 40 nm. This is because such particles may be uniformly dispersed in the adhesive layer, so that the adhesive layer may be more successfully prevented from causing knick, while ensuring a necessary level of adherence, and thereby the durability of the polarizer may be improved.

Any appropriate compounds may be used as the metal compound. The metal compound is exemplified by metal oxides such as alumina, silica, zirconia and titania; metal salts such as alumina silicate, calcium carbonate, magnesium silicate, zinc carbonate, barium carbonate and calcium phosphate; and ores such as celite, talc, clay and kaolin. Among them, alumina is preferable.

When the metal compound (preferably, metal compound colloid) is mixed, the content of which is preferably 40% by mass or less of the resin (adhesive), and more preferably 1% by mass or more and up to 30% by mass.

<<Other Additives>>

The adhesive layer in the present invention may be added with compounds other than those described above, without departing from the spirit of the present invention.

One example is boric acid. The compound, etc. represented by the formula (1) has an effect of promoting bonding of boric acid and hydroxy group of the polymer. For the case where the polarizing plate protective film is composed of an cellulose acylate-based polarizing plate protective film, having on the surface thereof a lot of hydroxy groups as a result of saponification, by adding the compound, etc. represented by the formula (1) to the adhesive layer, crosslinking by boric acid is promoted between the adhesive layer and the polarizer layer, and between the adhesive layer and the polarizing plate protective film, thereby the adherence may further be improved.

When boric acid is used, the amount of use is preferably 1% by mass or more and 10000% by mass or less of the compound, etc. represented by the formula (1), and more preferably 10% by mass or more and 1000% by mass or less.

The other additives are exemplified by chain transfer agent, sensitizer, tackifier, thermoplastic resin, filler, fluidity modifier, plasticizer and defoaming agent. When these additives are used, the amount of use is preferably 40% by mass or less of the resin (adhesive), and more preferably 0.1% by mass or more and up to 30% by mass.

Among them, metal compound colloid is preferably contained as the other additives, for the reason described later.

Materials and handling of the resin used for these adhesive layers may be referred to, for example, descriptions in paragraphs [0069] to [0138] of JP-A-2012-014148, paragraphs [0013] to [0020] of JP-A-2009-244800, paragraphs [0039] to [0086] of JP-A-2010-230806, and paragraphs [0114] to [0119] of JP-A-2009-139658.

The thickness of the adhesive layer is appropriately determined depending on purpose of use and target adherence. More specifically, when a pressure sensitive adhesive is used for the adhesive layer, the thickness of the adhesive layer preferably falls in the range from 0.1 to 50 μm, more preferably from 0.5 to 20 μm, still more preferably from 1 to 15 μm, and particularly from 5 to 10 μm.

When an adhesive is used for the adhesive layer, the thickness of the adhesive layer preferably falls in the range from 10 to 500 nm, more preferably from 10 to 400 nm, and furthermore preferably from 20 to 350 nm.

(Method of Laminating Polarizer and Adhesive Layer)

The method of laminating the polarizer and the adhesive layer includes a step of stacking the polarizer and the adhesive layer, that is, a method of manufacturing the laminate of the present invention.

At what time the compound, etc. represented by the formula (1) is added is not specifically limited, so long as the compound is finally contained in the product.

While not specifically limited, the method of laminating the adhesive layer on the polarizer is preferably coating, from the viewpoint of controllability and efficiency of manufacture.

Method of coating is arbitrarily selectable from appropriate methods. The method of coating is exemplified by spin coating, roll coating, flow coating, dip coating, and bar coating.

<Polarizer>

The polarizer usable for the laminate of the present invention includes iodine-containing polarizer, dye-containing polarizer using dichroic dye, and polyene-based polarizer. While the polarizer in the present invention is preferably composed of polyvinyl alcohol (PVA) and a dichroic molecule, it is alternatively possible to use polyvinylene-based polarizer obtained by dehydrating or dechlorinating PVA or polyvinyl chloride to produce a polyene structure, followed by orientation as described in JP-A-H11-248937.

Materials preferably used for the polarizer may be referred to, for example, the description in paragraphs [0024] to [0027] of JP-A-2012-014148, the content of which is incorporated into this specification.

While not specifically limited, the thickness of the polarizer film before stretched is preferably 1 μm to 200 μm, and particularly 10 to 100 μm, from the viewpoint of stability of holding of the film and uniformity of stretching. It is alternatively possible to use a thin PVA film which produces a stress of 10 N or smaller when stretched in a stretching ratio of 4 to 6 in water, as described in JP-A-2002-236212.

Methods of manufacturing the polarizer are selectable from those described in paragraphs [0213] to [0255] of JP-A-2007-86748.

<Polarizing Plate>

The polarizing plate of the present invention has a protective film formed on the surface of the adhesive layer of the laminate of the present invention. The polarizing plate of the present invention, thus having the laminate of the present invention, is improved in the durability of the polarizer under high-temperature and high-humidity conditions and the single plate transmittance, and also in the adherence between the polarizer and the polarizing plate protective film.

The polarizing plate protective film preferably satisfies the characteristics below.

Now, for the case where the polarizing plate of the present invention has two sheets of polarizing plate protective film, these two sheets may be the same or different.

From the viewpoint of ensuring a sufficient intensity of transmitted light through the polarizing plate of the present invention, the transmittance of the polarizing plate protective film is preferably 85% or above, more preferably 88% or above, and particularly 90% or above.

The polarizing plate protective film preferably has a haze of 2% or below, more preferably 1.5% or below, and particularly 1.0% or below.

The polarizing plate protective film generally has a thickness of 25 to 300 μm, preferably 20 to 200 μm, and more preferably 15 to 100 μm.

Source material for composing the polarizing plate protective film is exemplified by cellulose ester-based resin, polycarbonate-based resin, polyester carbonate-based resin, polyarylate-based resin, polysulfone-based resin, polyethersulfone-based resin, cycloolefin-based resin such as norbornene-based resin, polystyrene-based resin, polyacrylate-based resin, polymethacrylate-based resin, polyester-based resin, and imide-based resin such as olefin-maleimide-based resin and glutarimide-based resin, which may be used independently, or in a mixed form. Films preferably used are those composed of, among these resins, cellulose ester-based resin, cycloolefin-based resin, polystyrene-based resin, imide-based resin, and polymethacrylate-based resin, which have relatively small birefringence ascribable to molecular orientation, and small photo-elastic coefficient.

Examples of the polarizing plate protective film preferably used include commercially available cellulose triacetate film (Fujitac TD80UF, from FUJIFILM Corporation), alicyclic structure-containing polymer resin film described in JP-A-2006-58322, and acrylic resin described in JP-A-2009-122644.

Resins preferable for composing the polarizing plate protective film, additives, and methods of manufacturing the same may be referred to JP-A-2005-104149, and paragraphs [0034] to [0040] of JP-A-2012-014148, the contents of which are incorporated into this specification.

The polarizing plate of the present invention is alternatively usable in the form of laminate of functional layers such as retardation layer, anti-reflection layer, hard coat layer, forward scattering layer, or antiglare layer stacked on the polarizing plate protective film; or in the form of functionalized polarizing plate combined with optical films such as a film having the functional layers described above, optical compensation film, and luminance enhancing film, for the purpose of improving visibility and mechanical characteristics of the display. The anti-reflection film, luminance enhancing film, other functional optical films, hard coat layer, forward scattering layer, and antiglare layer are described in paragraphs [0257] to [0276] of JP-A-2007-86748. Based on the description, the functionalized polarizing plate may be manufactured.

The polarizing plate of the present invention is also usable as a functional optical film further provided with functional layers such as hard coat layer, forward scattering layer, antiglare layer, gas barrier layer, slipping layer, antistatic layer, under coat layer and protective layer. These functional layers are also usable by combining with each other in the same layer with the anti-reflection layer or with an optically anisotropic layer in the aforementioned anti-reflection film. These functional layers may be used as provided on either one side directed to the polarizer or on the opposite side (directed to the outer air), or on both sides. The functions which may be combined into the polarizing plate protective film are referred to JP-A-2005-104149, and paragraphs [0139] to [0160] of JP-A-2012-014148, the contents of which are incorporated into this specification.

<Product Form of Polarizing Plate>

Product form of the polarizing plate of the present invention includes not only a polarizing plate in the form of film piece cut into a size suitable for assemblage into the liquid crystal display device, but also a roll obtained by taking up a long web manufactured by continuous production (for example, rolls with a length of web of 2500 m or longer, or 3900 m or longer). Considering applications to large-sized liquid crystal display device, the polarizing plate is preferably 1000 mm wide or wider.

<Performance of Polarizing Plate>

The polarizing plate of the present invention, given with the configuration described above, is successfully improved in the durability of the polarizer under high-temperature and high-humidity conditions, without degrading the durability of the polarizer under high-temperature and high-humidity conditions.

In this specification, the durability of the polarizer is evaluated by measuring changes in cross transmittance of the polarizing plate under a specific environment.

(Cross Transmittance CT)

The polarizing plate of the present invention preferably has a cross transmittance CT expressed by $CT \leq 2.0$, more preferably $CT \leq 1.3$, and particularly $CT \leq 0.6$ (all in %).

(Changes in Cross Transmittance)

For the polarizing plate of the present invention, the smaller the changes in the polarizing plate durability test, the better.

The polarizing plate of the present invention, which is allowed to stand at 60° C. with a relative humidity of 95% for 500 hours, preferably shows the amount of change (%) in the cross single plate transmittance of 0.60% or smaller, and, after allowed to stand at 80° C. in a dry environment (without moisture control, at a relative humidity of 0% to 20% in Examples of the present invention) for 500 hours, preferably shows the amount of change (%) in the cross single plate transmittance of 0.10% or smaller.

The amount of change (%) in the cross single plate transmittance after allowed to stand at 60° C. with a relative humidity of 95% for 500 hours is preferably 0.30% or smaller, and more preferably 0.25% or smaller. Meanwhile, the amount of change (%) in the cross single plate transmittance after allowed to stand at 80° C. in a dry environment for 500 hours is preferably 0.05% or smaller.

The amount of change herein means remainder of subtraction of a measured value before the test from a measured value after the test.

If the amount of change in the cross transmittance falls in the above-described ranges, the polarizing plate is preferably ensured to have a good level of stability during long-term use or storage under high-temperature and high-humidity conditions, and under high-temperature and low-humidity conditions.

The cross transmittance CT of the polarizing plate was measured using VAP-7070 (from JASCO Corporation). Measurement is conducted at 410 nm, and average values from the measurement repeated 10 times are used.

The polarizing plate durability test is conducted as described below, using a polarizing plate bonded to a glass plate while placing a pressure sensitive adhesive in between. Two samples, each having a polarizing plate bonded to a glass plate (ca. 5 cm×5 cm) so as to direct the cellulose acylate film of the present invention to the interface with the air, are manufactured.

The single plate cross transmittance is measured by setting each sample while directing the cellulose acylate film of the present invention to the light source.

Two samples are independently measured, and an average value is determined as the single plate cross transmittance of the polarizing plate in Examples.

Each polarizing plate is allowed to stand under an environment at 80° C., 90% relative humidity, for 168 hours, and then measured with respect to the cross transmittance in the same way.

Difference in the cross transmittance before and after the elapse of time is determined, and is used for evaluating the durability of the polarizing plate. The relative humidity in an environment without intentional humidity control is adjusted in the range from 0 to 20% RH.

(Other Characteristics)

Other preferable optical characteristics of the polarizing plate of the present invention are described in paragraphs [0238] to [0255] of JP-A-2007-086748, which are preferably satisfied.

<Method of Manufacturing Polarizing Plate>

The method of manufacturing the polarizing plate of the present invention includes bonding a polarizer with a protective film or with a substrate, using an adhesive or pressure sensitive adhesive containing a resin and a compound represented by the formula (1).

The polarizing plate of the present invention is laminated with the individual constitutive members, making use of the adhesive layer.

The surface on which the adhesive layer is formed is the surfaces of the polarizer or the surface of the polarizing plate protective film or other constitutive members, or may be both of them. A well known constitutive member is the polarizing plate protective film described above.

In the process of bonding the polarizing plate of the present invention to the polarizer of the polarizing plate protective film, it is preferable to align the transmission axis of the polarizer substantially in parallel with the slow axis of the polarizing plate protective film.

Now "substantially in parallel with" means that shift between the direction of principal refractive index nx of the polarizing plate protective film containing the compound and the direction of the transmission axis of the polarizing plate falls within 5°, preferably within 1°, and more preferably within 0.5°. If the shift falls within 1°, the polarizing plate is less likely to degrade in the polarization performance under the crossed Nicol, and is advantageous in terms of less opportunity of leakage of light.

The constitutive member other than the polarizing plate protective film may be a translucent support of display devices such as liquid crystal cell and organic EL panel, or may be a front panel disposed so as to protect the display devices.

The adhesive layer in the present invention is preferably disposed on the light-coming side of the polarizer, where degradation-inducing energy beam such as ultraviolet radiation is incident. If the adhesive layer in the present invention is disposed on the energy beam-coming side, the aforementioned effect is demonstrated at the interface where the polarizer is susceptible to damage, and this further contributes to improve the durability of the polarizer.

<Liquid Crystal Display Device>]

Next, the liquid crystal display device of the present invention will be explained.

FIG. 1 is an exemplary schematic drawing illustrating an exemplary liquid crystal display device of the present invention. As seen in FIG. 1, a liquid crystal display device 10 is configured by a liquid crystal cell, which has a liquid crystal layer 5, and an upper electrode substrate of liquid crystal cell 3 and a lower electrode substrate of liquid crystal cell 6 disposed on the upper and lower sides thereof; and an upper polarizing plate 1 and a lower polarizing plate 8 disposed on both sides of the liquid crystal cell. A color filter may be disposed between the liquid crystal cell and each of the polarizing plates. When the liquid crystal display device 10 is used in the form of transmission type, a back light which uses a cold cathode or hot cathode fluorescent lamp, a light emitting diode, field emission element, or electroluminescent element as a light source, is disposed on the back side.

Each of the upper polarizing plate 1 and the lower polarizing plate 8 is often used in a configuration in which a polarizer is held between two sheets of polarizing plate protective film. The liquid crystal display device of the present invention 10 may alternatively be configured by using an optical compensation film as the protective film on the liquid crystal cell side of the polarizing plate, or may still alternatively be configured by directly bonding the polarizer with the electrode substrates 3 and 6 using an adhesive layer, without placing the protective film in between.

The liquid crystal display device 10 includes those of direct view type, projection type, and optical modulation type. Operation mode of the liquid crystal layer 5 is arbitrarily selectable from known various modes which include TN mode, VA mode, fringe-field switching mode including IPS mode, OCB mode and ECB mode.

While not exemplified, the polarizing plate of the present invention is also usable as a part of circular polarizing plate which is disposed for antireflective purposes in other configurations, such as reflection-type and semi-transmissive liquid crystal display devices, and self-emitting elements such as organic EL element.

EXAMPLE

Paragraphs below will further specifically describe features of the present invention, referring to Examples and Comparative Examples. Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

Example 1

1. Preparation of Polarizing Plate Protective Film

<Exemplary Preparation 1>
<<Film-Forming of Cellulose Acylate Film>>
<<<Preparation of Cellulose Acylate Solution 101>>>

The composition below was placed in a mixing tank, and stirred to dissolve the individual components, to thereby prepare a cellulose acylate solution 101.

| Composition of Cellulose Acylate Solution 101 | |
|---|---|
| Cellulose acetate, degree of acetyl substitution = 2.87, degree of polymerization = 370 | 100.0 parts by mass |
| Hydrophobizing agent 1 (A-1) | 10.5 parts by mass |
| UV absorber D | 1.5 parts by mass |
| Methylene chloride (first solvent) | 412.2 parts by mass |
| Ethanol (second solvent) | 35.8 parts by mass |

-continued

Composition of Cellulose Acylate Solution 101

UV absorber D

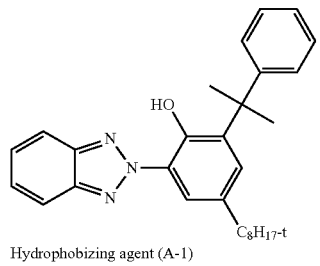

Hydrophobizing agent (A-1)

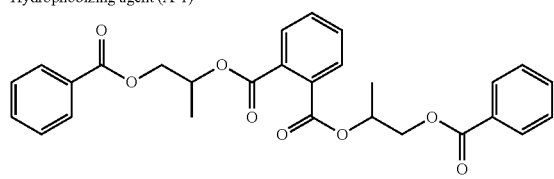

<<<Preparation of Matting Agent Solution 102>>>

The composition below was placed in a dispersion machine, and stirred to dissolve the individual components, to thereby prepare a matting agent solution 102.

| Composition of Matting Agent Solution 102 | |
|---|---|
| Silica particle, average particle size = 20 nm (Aerosil R972, from Nippon Aerosil Co., Ltd.) | 2.0 parts by mass |
| Methylene chloride (first solvent) | 79.9 parts by mass |
| Ethanol (second solvent) | 6.9 parts by mass |
| Cellulose acylate solution 101 | 0.9 parts by mass |

<<<Casting>>>

Using an in-line mixer, 1.3 parts by mass of matting agent solution 202 and 98.7 parts by mass of cellulose acylate solution 201 were added and mixed. The thus-prepared dope was then cast on a stainless-steel casting support of a band casting machine (support temperature=22° C.). The resultant film, with approximately 20% by mass of residual solvent retained therein, was peeled off, held at both widthwise edges using a tenter, and stretched widthwise at 120° C. in a stretching ratio of 1.10 (10%), while keeping the residual solvent content to 5 to 10% by mass, accompanied by drying. The film was further dried while conveying it through rolls of an annealing apparatus, to thereby obtain a cellulose acylate film. The obtained cellulose acylate film (polarizing plate protective film) was found to be 25 μm thick and 1480 mm wide.

2. Manufacture of Polarizer

Exemplary Preparation 2

A 75 μm-thick polymer film mainly composed of polyvinyl alcohol-based resin (trade name "VF-PS#7500", from Kuraray Co., Ltd.) was dipped in five baths [1] to [5] below, while applying tension in the longitudinal direction of the film, and stretched in a final stretching ratio of 6.2 relative to the original length of the film. The thus-stretched film was dried in an air circulating oven at 40° C. for one minute, to thereby manufacture a polarizer.

<<Conditions>>

[1] Swelling bath: pure water at 30° C.
[2] Dye bath: aqueous solution at 30° C., containing 0.032 parts by weight of iodine and 0.2 parts by weight of potassium iodide, per 100 parts by weight of water.
[3] First crosslinking bath: aqueous solution at 40° C. containing 3% by weight of potassium iodide and 3% by weight of boric acid.
[4] Second crosslinking bath: aqueous solution at 60° C., containing 5% by weight potassium iodide and 4% by weight of boric acid.
[5] Washing bath: Aqueous solution at 25° C., containing 3% by weight potassium iodide.

3. Saponification of Polarizing Plate Protective Film

Exemplary Preparation 3

The polarizing plate protective film of Exemplary Preparation 1 was dipped in a 2.3 mol/L aqueous sodium hydroxide solution at 55° C. for 3 minutes. The film was then washed in a washing bath at room temperature, and then neutralized at 30° C. using a 0.05 mol/L sulfuric acid. The film was again washed in a washing bath at room temperature, and then air dried at 100° C.

4. Preparation of Adhesive

Exemplary Manufacture 1

A water-soluble adhesive, which contains a polyvinyl alcohol-based resin containing the compound represented by the formula (1) and a metal compound colloid, was prepared according to the method below.

One hundred parts by mass of an acetoacetyl group-containing, polyvinyl alcohol-based resin (trade name "Gohsefimer Z200", from The Nippon Synthetic Chemical Industry Co., Ltd., average degree of polymerization=1200, degree of saponification=98.5 mol %, degree of acetoacetylation=5 mol %) and 50 parts by mass of methylolmelamine were dissolved into pure water under a temperature condition of 30° C., to thereby obtain an aqueous solution with the solid content concentration adjusted to 3.7%. To 100 parts by mass of the aqueous solution, 18 parts by mass of alumina colloid aqueous solution (average particle size=15 nm, solid content concentration=10%, positively charged), and 0.1 parts by mass of Compound (A-35) represented by the formula (1) were added, to thereby prepare a water-soluble adhesive.

Example 101

The polarizing plate protective film of Exemplary Preparation 1 was bonded to one side of the polarizer of Exemplary Preparation 2, while placing in between the adhesive prepared in Exemplary Manufacture 1, while aligning the slow axis of the polarizing plate protective film of Exemplary Preparation 1 orthogonal to the absorption axis of the polarizer. Next, the polarizing plate protective film of Exemplary Preparation 1 was bonded to the other side of the polarizer, while placing in between the water-soluble adhesive prepared in Exemplary Manufacture 1. The thus-obtained laminate was dried in an oven at 60 to 90° C. for 5 minutes.

After the drying, the laminate was heated (annealed) by allowing it to pass through an oven at 80° C. over 10 minutes. The thickness of the thus-obtained adhesive layer was shown in Table 1 below. A polarizing plate of Example 101 was thus manufactured.

Other Examples and Comparative Examples

Polarizing plates of other examples and Comparative Examples were manufactured in the same way as Example 101, except that the species and amounts of the compound represented by the formula (1), and the thickness of the adhesive layer were altered as listed in Table 1.

5. Evaluation of Durability of Polarizing Plate

<Evaluation of Changes in Single Plate Transmittance>

Each of the polarizing plates of Examples and Comparative Examples manufactured as described above was subjected to measurement of cross transmittance CT at wavelengths of 410 nm and 510 nm, using VAP-7070 (from JASCO Corporation). Average values of measured values from the measurement repeated 10 times were used.

The polarizing plate durability test was conducted as described in the next, using the polarizing plate bonded to a glass plate while placing the pressure sensitive adhesive in between. Two samples, each having the polarizing plate bonded to the glass plate (ca. 5 cm×5 cm), were manufactured. The single plate cross transmittance was measured by setting each sample while directing the film side thereof to the light source. Two samples were independently measured, and an average value was determined as the cross transmittance of the polarizing plate.

Thereafter, the polarizing plate was kept in an environment of 80° C. and a relative humidity of 90% for 168 hours, and cross transmittance was measured in the same way as described above. Changes in the cross transmittance at 410 nm, before and after the elapse of the time, were determined, evaluated according to the criteria below, and the results were shown in Table below, as an index of durability of polarizer under the high-temperature and high-humidity condition.

The amount of change in the cross transmittance is now given by the equation below:

Amount of change in cross transmittance (%)={(cross transmittance (%) after durability test)−(cross transmittance (%) before durability test)}

<Evaluation of Degree of Polarization>

Degree of polarization was determined by measuring the cross transmittance and parallel transmittance using VAP-7070 (from JASCO Corporation), followed by calculation using the measured values based on the equation below:

Degree of polarization (%)=[{(Cross transmittance)−(Parallel transmittance)}/{(Cross transmittance)+(Parallel transmittance)}]$^{1/2}$×100

<Evaluation of Adherence of Polarizing Plate>

Each of the polarizing plates manufactured in Examples and Comparative Examples described above was cut into a size of 16 cm×16 cm, and bonded on one side thereof to a glass plate while placing in between an pressure sensitive adhesive sheet (from Soken Chemical Engineering Co., Ltd.). Then a 10 cm-wide cut was made on the polarizing plate from the surface thereof using a cutting blade, at a position 4 cm recessed from the edge, and the polarizing plate was then peeled at the position off from the glass plate. Area of a portion causing internal separation of the polarizing plate, rather than the interface between the pressure sensitive adhesive and the polarizing plate, was measured, thereby the adherence between the polarizer and the protective film was evaluated according to the criteria below. Results were shown in Table 1.

A: Area of separated portion, other than interface between polarizing plate and pressure sensitive adhesive, is smaller than 10%.

B: Area of separated portion, other than interface between polarizing plate and pressure sensitive adhesive, is 10% or larger and smaller than 30%.

C: Area of separated portion, other than interface between polarizing plate and pressure sensitive adhesive, is 30% or larger.

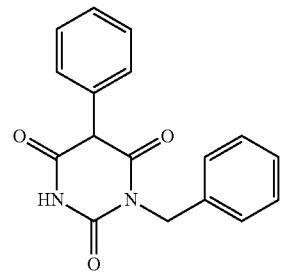

[A-35]

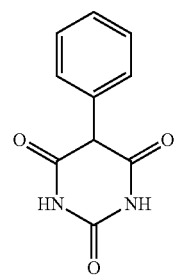

[A-33]

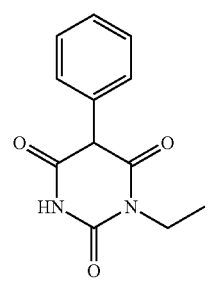

[A-34]

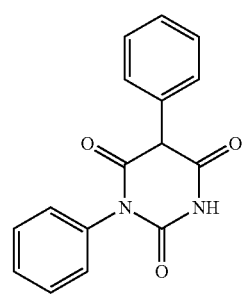

[A-37]

-continued (A-46)
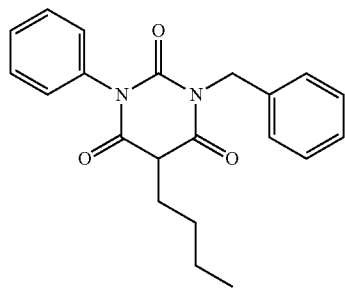

(A-55)
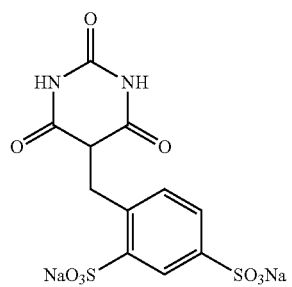

(A-70)
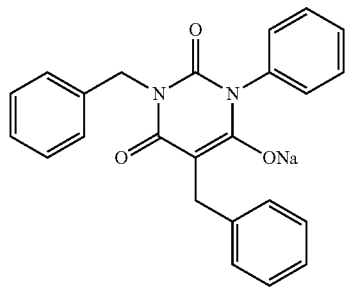

[B-1]
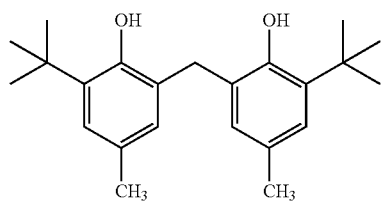

-continued

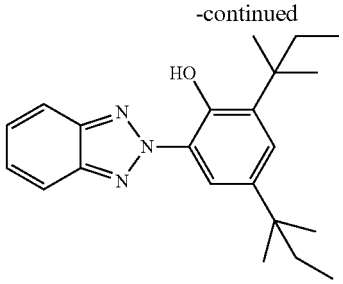

[Tinuvin 328 (from BASF)]

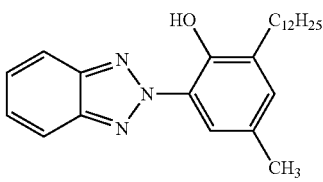

Tinuvin 171 (from BASF)]

[Compound C]
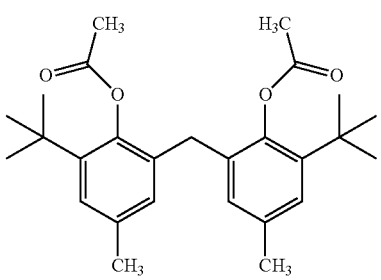

[Compound D]
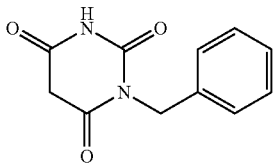

TABLE 1

| | Adhesive layer | | | | Durability of polarizer | | |
| | Benzyl radical generating agent | | | | Degree of polarization | Change in single plate transmittance at 410 nm | Adherence |
| | Species | Molecular weight | Amount of addition % by mass (relative to adhesive resin) | Amount of coating (g/m²) | Thickness (μm) | 80° C., 90%, 168 h (%) | 80° C., 90%, 168 h (%) | of polarizing plate |
|---|---|---|---|---|---|---|---|---|
| Example 101 | (A-35) | 294 | 2.7 | 0.089 | 5 | 99.94 | 26.2 | A |
| Example 102 | (A-33) | 294 | 2.7 | 0.089 | 5 | 99.94 | 26.1 | A |
| Example 103 | (A-34) | 294 | 2.7 | 0.089 | 5 | 99.94 | 26.3 | A |
| Example 104 | (A-37) | 204 | 2.7 | 0.089 | 5 | 99.94 | 26.2 | A |
| Example 105 | (A-70) | 318 | 2.7 | 0.089 | 5 | 99.92 | 26.3 | A |
| Example 106 | (A-46) | 350 | 2.7 | 0.089 | 5 | 99.92 | 26.3 | A |
| Example 107 | (A-55) | 350 | 2.7 | 0.089 | 5 | 99.94 | 26.2 | A |
| Example 108 | (A-33) | 232 | 13.5 | 0.417 | 5 | 99.96 | 26.1 | A |
| Example 109 | (A-33) | 280 | 27 | 0.769 | 5 | 99.98 | 26 | A |
| Example 110 | (A-33) | 280 | 13.5 | 0.834 | 10 | 99.98 | 26.1 | A |
| Example 111 | (A-33) | 280 | 13.5 | 0.083 | 1 | 99.95 | 26.2 | A |

TABLE 1-continued

| | Adhesive layer | | | | | Durability of polarizer | | |
| --- | --- | --- | --- | --- | --- | --- | --- | --- |
| | Benzyl radical generating agent | | | | | Degree of polarization | Change in single plate transmittance at 410 nm | Adherence |
| | Species | Molecular weight | Amount of addition % by mass (relative to adhesive resin) | Amount of coating (g/m²) | Thickness (μm) | 80° C., 90%, 168 h (%) | 80° C., 90%, 168 h (%) | of polarizing plate |
| Example 112 | (A-33) | 280 | 0.6 | 0.020 | 10 | 99.91 | 26.2 | B |
| Comparative Example 101 | None | — | 0 | 0 | 5 | 99.87 | 26.3 | C |
| Comparative Example 102 | TINUVIN328 | 351 | 2.7 | 0.089 | 5 | 99.87 | 25.7 | C |
| Comparative Example 103 | (B-1) | 341 | 0.5 | 0.017 | 10 | 99.87 | 25.3 | C |
| Comparative Example 104 | 2,4-Di-tert-butylphenol | 206 | 13.5 | 0.834 | 10 | 99.88 | 0.8 | C |
| Comparative Example 105 | 2,6-Di-tert-butylphenol | 206 | 13.5 | 0.834 | 10 | 99.89 | 17 | C |
| Comparative Example 106 | TINUVIN171 | 394 | 2.7 | 0.089 | 5 | 99.85 | 25.6 | C |
| Comparative Example 107 | CompoundC | 424 | 2.7 | 0.089 | 5 | 99.88 | 26.1 | C |
| Comparative Example 108 | CompoundD | 218 | 13.5 | 0.834 | 10 | 99.75 | 25.2 | C |

It was found from the results shown in Table 1 that the polarizing plates, having the polarizer-adjoining layers containing an adhesive (adhesive layer) and added with the compounds used in the present invention, were less causative of degradation of the polarizer after allowed to stand under the high-temperature and high-humidity condition, and therefore preferable.

In contrast, based on the results of Comparative Example 101, the polarizing plate having the adhesive layer not containing the compound, etc. represented by the formula (1) was found to be largely degraded in the polarizer after allowed to stand under the high-temperature and high-humidity condition. It was also found from the results of Comparative Example 102, that the polarizing plate having the polarizer-adjoining layer containing the adhesive and added with a compound other than the compound represented by the formula (1), such as Tinuvin 328 used in JP-A-H06-265725, was largely degraded in the polarizer after allowed to stand under high-temperature and high-humidity condition.

Meanwhile, the polarizing plate of Example 108 containing the compound, etc. represented by the formula (1) was found to show the single plate transmittance at 410 nm larger than those of the polarizing plates of Comparative Examples 104 and 105 which contain phenolic compounds after allowed to stand under the high-temperature and high-humidity condition, and was found to be preferable.

It was also found that the polarizing plates, using the laminates which contain the compounds, etc. represented by the formula (1) in the present invention, were superior to the polarizing plates of Comparative Examples in terms of adherence, and were therefore preferable.

Example 2

Figure 2:
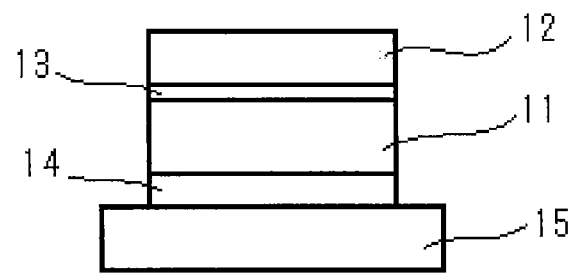
FIG. 2 is a schematic drawing illustrating an embodiment of polarizing plate of Examples 201 to 204.

Polarizing plates of Examples 201 to 204 were manufactured in the same way as Example 101, except that the species and amount of the compound, etc. represented by the formula (1), and the thickness of the adhesive layer were changed as summarized in Table 2. More specifically, as illustrated in FIG. 2, a polarizer 11 and a polarizing plate protective film 12 were bonded while placing in between an adhesive layer 13 which contains the compound, etc. represented by the formula (1) to thereby manufacture each polarizing plate. A glass plate 15 was further bonded to one surface of the polarizer, while placing in between a pressure-sensitive adhesive 14, for the convenience of evaluation of durability of the polarizer.

On the other hand, as Comparative Examples 202 to 203, the polarizing plates were manufactured as described below, while changing the layer, to which the compound, etc. represented by the formula (1) is added, from the adhesive layer to the protective film.

The protective films, which contain the compound, etc. represented by the formula (1), used for Comparative Examples 202 to 203, were manufactured in the same way as the polarizing plate protective film of Exemplary Preparation 1, except that the compound, etc. represented by the formula (1) was added to the cellulose acylate solution 101, and the thickness was changed to 80 μm as summarized in Table 2.

In addition, a polarizing plate of Comparative Example 201 was manufactured in the same way with Example 101, except that the compound, etc. represented by the formula (1) was not added in the adhesive manufactured in Exemplary Manufacture 1.

Figure 3:
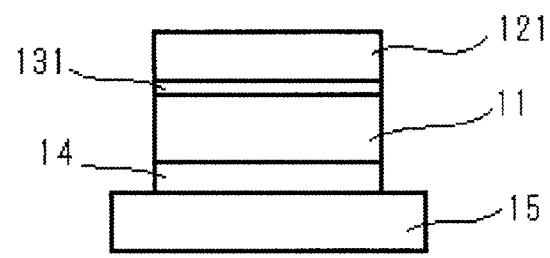
FIG. 3 is a schematic drawing illustrating an embodiment of polarizing plate of Comparative Examples 203 to 206.

More specifically as illustrated in FIG. 3, in each of Comparative Examples 202 to 203, the polarizer 11 and a polarizing plate protective film 121 which contains the compound, etc. represented by the formula (1) were bonded while placing in between an adhesive layer 132 which contains no compound, etc. represented by the formula (1) to thereby manufacture each polarizing plate. The glass plate 15 was bonded to one surface of the polarizer 11, while placing in between a pressure-sensitive adhesive 14, for the convenience of evaluation of durability of the polarizer.

The thus manufactured polarizing plates of Examples and Comparative Examples were evaluated with respect to durability and the adherence, in the same way as described in Example 1. Results are shown in Table 2.

[A-40]

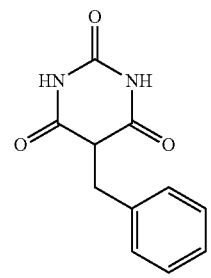

TABLE 2

|  | Protective film | | | | Adhesive layer | | | | Durability of polarizer Degree of polarization | Adherence |
|---|---|---|---|---|---|---|---|---|---|---|
|  | Thickness | Compound represented by formula (1) | | | Thickness | Compound represented by formula (1) | | | 80° C., 90%, 168 h | of polarizing |
|  | μm | Species | Amount of addition parts by mass[a] | g/m² | μm | Species | Amount of addition parts by mass[b] | g/m² | % | plate |
| Example 201 | 80 | None | — | — | 2.5 | A-40 | 6 | 0.1 | 99.90 | A |
| Example 202 | 80 | None | — | — | 2.5 | A-40 | 13 | 0.2 | 99.95 | A |
| Example 203 | 80 | None | — | — | 2.5 | A-40 | 30 | 0.4 | 99.98 | A |
| Example 204 | 80 | None | — | — | 10 | A-40 | 30 | 1.7 | 99.99 | A |
| Comparative Example 201 | 80 | None | — | — | 0.3 | None | — | — | 99.74 | C |
| Comparative Example 202 | 80 | A-40 | 0.8 | 0.5 | 0.3 | None | — | — | 99.78 | C |
| Comparative Example 203 | 80 | A-40 | 1.3 | 0.9 | 0.3 | None | — | — | 99.85 | C | a) Amount of addition per 100 parts by mass of cellulose acylate.
b) Amount of addition per 100 parts by mass of polyvinyl alcohol resin.

From the results shown in Table 2, the polarizing plates, having the compound, etc. represented by the formula (1) in the present invention added to the adhesive layer, were found to successfully suppress the polarizer from degrading only with a small amount of coating, after allowed to stand under the high-temperature and high-humidity condition, as compared with the polarizing plates having the compound, etc. represented by the formula (1) added to the protective film (Examples 201 to 204). The polarizing plates of Examples were also found to show good adherence.

This is supposedly because, when the compound, etc. represented by the formula (1) in the present invention is contained in the adhesive layer, rather than in the protective film, the compound, etc. represented by the formula (1) in the present invention can exist much in the vicinity of the polarizer, to thereby contribute to stabilize the polarizer in an effective manner.

It is concluded from the results described above, that by incorporating the polarizing plate, which contains the compound relevant to the present invention in the adhesive layer adjoining to at least one surface of the polarizer, into the liquid crystal display device, it now becomes possible to obtain the liquid crystal display device with good performance even after allowed to stand under high temperature and high humidity conditions.

1 upper polarizing plate
2 direction of absorption axis of upper polarizing plate
3 upper electrode substrate of liquid crystal cell
4 direction of alignment control of upper substrate
5 liquid crystal layer
6 lower electrode substrate of liquid crystal cell
7 direction of alignment control of lower substrate
8 lower polarizing plate
9 direction of absorption axis of lower polarizing plate
10 liquid crystal display device
11 polarizer
12 polarizing plate protective film
13 adhesive layer
14 pressure sensitive adhesive
15 glass plate
121 polarizing plate protective film
131 adhesive layer The present disclosure relates to the subject matter contained in Japanese Patent Application Nos. 034156/2013, filed on Feb. 25, 2013 and 020395/2014, filed on Feb. 5, 2014, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A laminate comprising a polarizer, and an adhesive layer adjoining to at least one surface of the polarizer, the adhesive layer containing a resin, and at least one species selected from the group consisting of a compound represented by the formula (1), a hydrate of the compound represented by the formula (1), a solvate of the compound represented by formula (1), and a salt of the compound represented by formula (1);

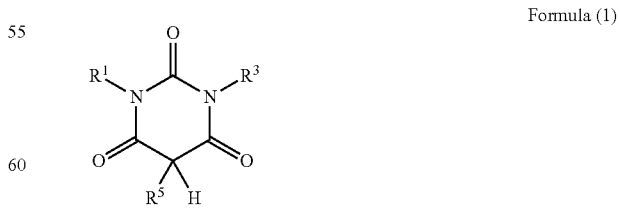

Formula (1)

in the formula (1), $R^1$ and $R^3$ each independently represents a hydrogen atom, $C_{1-20}$ straight-chain alkyl group, $C_{3-20}$ branched alkyl group, $C_{3-20}$ cycloalkyl group, $C_{2-20}$ alkenyl group or $C_{6-20}$ aromatic group, and $R^5$ represents an alkyl group or an aralkyl group; provided that at least one of $R^1$, $R^3$, and $R^5$ may contain a water-soluble group.

2. The laminate of claim 1, wherein the content of the compound represented by the formula (1), the hydrate of the compound represented by formula (1), the solvate of the compound represented by formula (1), and the salt of the compound represented by formula (1) in the adhesive layer exceeds 0.5% by mass and 50% by mass or less of the resin.

3. The laminate of claim 1, wherein the resin is a water-soluble adhesive or UV-curable adhesive.

4. The laminate of claim 2, wherein the resin is a water-soluble adhesive or UV-curable adhesive.

5. A polarizing plate comprising the laminate described in claim 1, and a protective film formed on the surface of the adhesive layer of the laminate.

6. The polarizing plate of claim 5, wherein the protective film is a cellulose acylate film.

7. A liquid crystal display device comprising the polarizing plate described in claim 5.

8. A method of manufacturing a polarizing plate, the method comprising bonding a polarizer with a protective film or with a substrate, using an adhesive or pressure sensitive adhesive containing a resin and a compound selected from the group consisting of a compound represented by the formula (1), a hydrate of the compound represented by the formula (1), a solvate of the compound represented by the formula (1), and a salt of the compound represented by the formula (1);

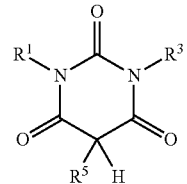

Formula (1)

in the formula (1), $R^1$, $R^3$ and $R^5$ each independently represents a hydrogen atom, $C_{1-20}$ straight-chain alkyl group, $C_{3-20}$ branched alkyl group, $C_{3-20}$ cycloalkyl group, $C_{2-20}$ alkenyl group or $C_{6-20}$ aromatic group, and $R^5$ represents an alkyl group or an aralkyl group; provided that at least one of $R^1$, $R^3$, and $R^5$ may contain a water-soluble group.

9. The laminate of claim 1, wherein $R^5$ represents an aralkyl group.

10. The laminate of claim 1, wherein $R^5$ represents a $C_{7-20}$ aralkyl group.

11. The laminate of claim 1, wherein $R^5$ represents a benzyl group.

* * * * *